US010660008B2

(12) United States Patent
Ma et al.

(10) Patent No.: US 10,660,008 B2
(45) Date of Patent: May 19, 2020

(54) DATA TRANSMISSION SYSTEM, METHOD, AND APPARATUS

(71) Applicant: HUAWEI TECHNOLOGIES CO., LTD., Shenzhen, Guangdong (CN)

(72) Inventors: Jie Ma, Shenzhen (CN); Bo Lin, Beijing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 75 days.

(21) Appl. No.: 16/036,728

(22) Filed: Jul. 16, 2018

(65) Prior Publication Data
US 2018/0343600 A1 Nov. 29, 2018

Related U.S. Application Data

(63) Continuation of application No. PCT/CN2016/073569, filed on Feb. 4, 2016.

(51) Int. Cl.
H04W 12/00 (2009.01)
H04W 40/02 (2009.01)
(Continued)

(52) U.S. Cl.
CPC ......... H04W 40/02 (2013.01); H04W 12/001 (2019.01); H04W 12/0013 (2019.01);
(Continued)

(58) Field of Classification Search
CPC ..... H04L 63/16; H04L 63/162; H04W 12/002
See application file for complete search history.

(56) References Cited

U.S. PATENT DOCUMENTS 10,425,448 B2 * 9/2019 Tevlin ................. H04L 63/0892
2007/0211659 A1 * 9/2007 Li ........................... H04L 63/08
370/329
(Continued)

FOREIGN PATENT DOCUMENTS

CN 101841920 A 9/2010
CN 102469509 A 5/2012
(Continued)

OTHER PUBLICATIONS

Written Opinion of the International Searching Authority for PCT/CN2016/073569, 5 pages, dated Oct. 27, 2016. (Year: 2016).*

Primary Examiner — Ponnoreay Pich
(74) Attorney, Agent, or Firm — Womble Bond Dickinson (US) LLP

(57) ABSTRACT

The present invention discloses a data transmission system. The first device performs, at a cellular network PDCP layer of the first device, security processing on to-be-transmitted data based on a transmit end-based first policy, to generate a PDU, and sends the PDU to the relay UE, where the first policy is a security processing policy agreed on by the first device and the second device, and the to-be-transmitted data is data that the first device needs to transmit to the second device. The relay UE sends the PDU to the second device. The second device performs, at a cellular network PDCP layer of the second device, security processing on the PDU based on a receive end-based first policy, to obtain the to-be-transmitted data, where the cellular network PDCP layer of the first device is a peer to the cellular network PDCP layer of the second device.

20 Claims, 20 Drawing Sheets

(51) Int. Cl.
  *H04W 88/04* (2009.01)
  *H04W 88/00* (2009.01)
  *H04W 12/02* (2009.01)
  *H04W 84/04* (2009.01)
  *H04W 92/18* (2009.01)

(52) U.S. Cl.
  CPC ........... *H04W 12/02* (2013.01); *H04W 88/00* (2013.01); *H04W 88/04* (2013.01); *H04W 84/042* (2013.01); *H04W 92/18* (2013.01)

(56) References Cited

U.S. PATENT DOCUMENTS

| | | | | |
|---|---|---|---|---|
| 2007/0258591 | A1* | 11/2007 | Terry | H04L 1/187 380/247 |
| 2008/0016350 | A1* | 1/2008 | Braskich | H04L 9/0833 713/169 |
| 2008/0226074 | A1* | 9/2008 | Sammour | H04W 80/02 380/270 |
| 2011/0010539 | A1* | 1/2011 | Salomone | H04L 9/321 713/155 |
| 2013/0016649 | A1 | 1/2013 | Damnjanovic et al. | |
| 2013/0044623 | A1 | 2/2013 | Speight et al. | |
| 2016/0006707 | A1* | 1/2016 | Ying | H04W 88/04 713/153 |
| 2017/0359854 | A1* | 12/2017 | Chiba | H04W 12/04 |
| 2018/0343600 | A1* | 11/2018 | Ma | H04W 88/00 |

FOREIGN PATENT DOCUMENTS

| | | |
|---|---|---|
| CN | 102724666 A | 10/2012 |
| CN | 102957475 A | 3/2013 |
| CN | 103297961 A | 9/2013 |
| EP | 2833694 A2 | 2/2015 |
| WO | 2012059049 A1 | 5/2012 |
| WO | 2014139109 A1 | 9/2014 |

* cited by examiner

DATA TRANSMISSION SYSTEM, METHOD, AND APPARATUS

CROSS-REFERENCE TO RELATED APPLICATIONS

This application is a continuation of International Application No. PCT/CN2016/073569, filed on Feb. 4, 2016, the disclosure of which is hereby incorporated by reference in its entirety.

TECHNICAL FIELD

The present invention relates to the field of communications technologies, and in particular, to a data transmission system, method, and apparatus.

BACKGROUND

A device-to-device (D2D) communication manner is a manner in which user equipments (UE) directly communicate with each other. If the two UEs that perform D2D communication are separately marked as UE 1 and UE 2, when the UE 1 is in a coverage area of a base station, the UE 2 may connect to the base station by using the UE 1. In this case, the user equipment 1 may be referred to as relay UE, to be specific, UE that provides a relay service; and the UE 2 is referred to as far-end UE or remote UE.

In the D2D communication manner, the far-end UE and the relay UE trust each other. To be specific, the relay UE can learn of communication content between the far-end UE and the base station. In this way, if information on the relay UE is stolen, the communication content between the far-end UE and the base station may be leaked. In other words, data transmission security is relatively low.

SUMMARY

Embodiments of the present invention provide a data transmission system, method, and apparatus, to improve data transmission security.

The following technical solutions are used in the embodiments of the present invention to achieve the foregoing objective.

According to a first aspect, a data transmission system is provided, including: a first device, relay user equipment UE, and a second device, where the first device performs, at a cellular network Packet Data Convergence Protocol (PDCP) layer of the first device, security processing on to-be-transmitted data based on a transmit end-based first policy, to generate a protocol data unit (PDU), and sends the PDU to the relay UE, where the first policy is a security processing policy agreed on by the first device and the second device, and the to-be-transmitted data is data that the first device needs to transmit to the second device;

the relay UE receives the PDU sent by the first device, and sends the PDU to the second device; and the second device receives the PDU sent by the relay UE, and performs, at a cellular network PDCP layer of the second device, security processing on the PDU based on a receive end-based first policy, to obtain the to-be-transmitted data.

According to a second aspect, a data transmission method is provided, including:

performing, by a first device at a cellular network Packet Data Convergence Protocol (PDCP) layer of the first device, security processing on to-be-transmitted data based on a transmit end-based first policy, to generate a protocol data unit (PDU), where the first policy is a security processing policy agreed on by the first device and a second device, and the to-be-transmitted data is data that the first device needs to transmit to the second device; and sending, by the first device, the PDU to the second device through relay user equipment UE, where the second device includes a cellular network PDCP layer.

According to a third aspect, a data transmission method is provided, including:

receiving, by relay user equipment UE, a PDU sent by a first device, where the PDU is a PDU generated after the first device performs, at a cellular network Packet Data Convergence Protocol (PDCP) layer of the first device, security processing on to-be-transmitted data based on a transmit end-based first policy, the first policy is a security processing policy agreed on by the first device and a second device, and the to-be-transmitted data is data that the first device needs to transmit to the second device; and sending, by the relay UE, the PDU to the second device, where the second device includes a cellular network PDCP layer.

According to a fourth aspect, a data transmission method is provided, including:

receiving, by a second device, a PDU that is from a first device and that is forwarded by relay user equipment UE, where the PDU is a PDU generated after the first device performs, at a cellular network Packet Data Convergence Protocol (PDCP) layer of the first device, security processing on to-be-transmitted data based on a transmit end-based first policy, the first policy is a security processing policy agreed on by the first device and the second device, and the to-be-transmitted data is data that the first device needs to transmit to the second device; and performing, by the second device at a cellular network PDCP layer of the second device, security processing on the PDU based on a receive end-based first policy, to obtain the to-be-transmitted data.

In any one of the foregoing aspects, compulsorily, the cellular network PDCP layer of the first device is a peer to the cellular network PDCP layer of the second device; and the first device is far-end UE, and the second device is a base station; or the first device is a base station, and the second device is far-end UE.

If the first device is far-end UE, and the second device is a base station, a data transmission process in an uplink direction is described in any one of the foregoing aspects. If the first device is a base station, and the second device is far-end UE, data transmission in a downlink direction is described in any one of the foregoing aspects.

According to the data transmission system and method provided in the embodiments of the present invention, peer cellular network PDCP layers are set on the far-end UE and the base station, and security processing is performed on to-be-transmitted data between the far-end UE and the base station separately at the cellular network PDCP layer of the far-end UE and the cellular network PDCP layer of the base station based on a security processing policy agreed on by the far-end UE and the base station, to ensure security of communication data between the far-end UE and the base station.

Optionally, in the foregoing first aspect or second aspect, the sending, by the first device, the PDU to the relay UE may include: sending, by the first device, the PDU to the relay UE successively through the cellular network PDCP layer of the first device and a protocol module of a first interface of the first device.

Correspondingly, in the foregoing first aspect or third aspect, the sending, by the relay UE, the PDU to the second device may include: sending, by the relay UE, the PDU to the second device successively through a protocol module of a first interface of the relay UE and a protocol module of a second interface of the relay UE.

Correspondingly, in the foregoing first aspect or fourth aspect, the receiving, by the second device, the PDU sent by the relay UE, and performing, at a cellular network PDCP layer of the second device, security processing on the PDU based on a receive end-based first policy, to obtain the to-be-transmitted data may include: receiving, by the second device, the PDU sent by the relay UE, transmitting the PDU to the cellular network PDCP layer of the second device through a protocol module of a second interface of the second device, and performing, at the cellular network PDCP layer of the second device, security processing on the PDU based on the receive end-based first policy, to obtain the to-be-transmitted data.

The protocol module of the first interface of the relay UE is a peer to the protocol module of the first interface of the first device, the protocol module of the second interface of the relay UE is a peer to the protocol module of the second interface of the second device, the first interface is a communications interface between the first device and the relay UE, and the second interface is a communications interface between the relay UE and the second device.

This optional implementation provides a data flow transmission process and a system protocol stack.

Optionally, a protocol module of an interface between the far-end UE and the relay UE includes a Media Access Control (MAC) layer and a physical (PHY) layer. The interface may be a first interface or a second interface.

In this optional implementation, based on the foregoing first aspect or second aspect, the sending, by the first device, the PDU to the relay UE successively through the cellular network PDCP layer of the first device and a protocol module of a first interface of the first device may include: sending, by the first device, the PDU to the relay UE successively through the cellular network PDCP layer of the first device, a cellular network Radio Link Control (RLC) layer of the first device, and the protocol module of the first interface of the first device.

In this optional implementation, based on the foregoing first aspect or fourth aspect, the receiving, by the second device, the PDU sent by the relay UE, and transmitting the PDU to the cellular network PDCP layer of the second device successively through a protocol module of a second interface of the second device may include: receiving, by the second device, the PDU sent by the relay UE, and transmitting the PDU to the cellular network PDCP layer of the second device successively through a protocol module of a second interface of the second device and a cellular network RLC layer of the second device.

In this optional implementation, a cellular network RLC layer is a peer to the cellular network RLC layer of the second device.

This optional implementation may be applicable to a scenario in which the far-end UE and the relay UE communicate with each other in a D2D communication manner. A protocol module of an interface between the far-end UE and the relay UE includes a MAC layer and a PHY layer, and this is a specific implementation of the protocol module of the interface between the far-end UE and the relay UE, but is not limited thereto. For example, the protocol module of the interface includes an RLC layer, a MAC layer, and a PHY layer.

Optionally, a protocol module of an interface (the interface may be a first interface or a second interface) between the far-end UE and the relay UE includes a first PDCP layer, used to perform security processing on data based on a second policy agreed on by the far-end UE and the relay UE.

In this optional implementation, based on the foregoing first aspect, the devices in the system may further implement the following functions: The base station sends a first instruction message to each of the far-end UE and the relay UE, where the first instruction message is used to instruct a receiver to establish the first PDCP layer; the far-end UE receives the first instruction message sent by the base station, and establishes the first PDCP layer on the far-end UE based on the first instruction message; and the relay UE receives the first instruction message sent by the base station, and establishes the first PDCP layer on the relay UE based on the first instruction message.

In this optional implementation, based on the foregoing second aspect, the first device is far-end UE, and the method may further include: receiving, by the far-end UE, a first instruction message sent by a base station, where the first instruction message is used to instruct the far-end UE to establish the first PDCP layer; and establishing, by the far-end UE, the first PDCP layer based on the first instruction message.

In this optional implementation, based on the foregoing second aspect, the first device is a base station, and the method may further include: sending, by the base station, a first instruction message to each of the far-end UE and the relay UE, where the first instruction message is used to instruct a receiver to establish the first PDCP layer.

In this optional implementation, based on the foregoing third aspect, the method may further include: receiving, by the relay UE, a first instruction message sent by the base station, where the first instruction message is used to instruct the relay UE to establish the first PDCP layer; and establishing, by the relay UE, the first PDCP layer based on the first instruction message.

This optional implementation provides an implementation in which the first PDCP layer is configurable, and during implementation, the base station may configure peer first PDCP layers for the relay UE and the far-end UE based on actual needs. In addition, after the peer first PDCP layers are set on the relay UE and the far-end UE, security of data transmission communication between the relay UE and the far-end UE can be ensured. In other words, a third party cannot steal content of exchanged information between the relay UE and the far-end UE by monitoring electromagnetic wave.

Optionally, a protocol module of an interface (the interface may be a first interface or a second interface) between the relay UE and the base station includes a second PDCP layer, used to perform security processing on data based on a third policy agreed on by the relay UE and the base station.

In this optional implementation, based on the first aspect, the devices in the system may further implement the following functions: The base station establishes the second PDCP layer, and sends a second instruction message to the relay UE, where the second instruction message is used to instruct the relay UE to establish the second PDCP layer; and the relay UE receives the second instruction message sent by the base station, and establishes the second PDCP layer on the relay UE based on the second instruction message.

In this optional implementation, based on the second aspect, the first device is a base station, and the method may further include: establishing, by the base station, the second PDCP layer; and sending, by the base station, a second instruction message to the relay UE, where the second instruction message is used to instruct the relay UE to establish the second PDCP layer.

In this optional implementation, based on the third aspect, the method may further include: receiving, by the relay UE, a second instruction message sent by the base station, where the second instruction message is used to instruct the relay UE to establish the second PDCP layer; and establishing, by the relay UE, the second PDCP layer based on the second instruction message.

This optional implementation provides an implementation in which the second PDCP layer is configurable, and during specific implementation, the base station may configure peer second PDCP layers for the base station and the relay UE based on actual needs. In this way, security of data transmission communication between the base station and the relay UE can be ensured. In other words, a third party cannot steal content of exchanged information between the far-end UE and the relay UE by monitoring electromagnetic wave.

Optionally, a radio resource control (RRC) layer of the first device is a peer to an RRC layer of the second device, the RRC layer of the first device is above the cellular network PDCP layer of the first device, and the RRC layer of the second device is above the RRC layer of the second device.

In this optional implementation, based on the foregoing first aspect, the devices in the system may further implement the following functions: The first device generates a radio resource control (RRC) message at the RRC layer of the first device, and sends the RRC message to the relay UE; the relay UE receives the RRC message, and sends the RRC message to the second device; and the second device receives the RRC message sent by the relay UE, and transmits the RRC message to the RRC layer of the second device.

In this optional implementation, based on the foregoing second aspect, the method may further include: generating, by the first device, a radio resource control RRC message at the RRC layer of the first device, and sending the RRC message to the second device through the relay UE.

In this optional implementation, based on the foregoing third aspect, the method may further include: receiving, by the relay UE, a radio resource control RRC message sent by the first device, where the RRC message is generated by the first device at the RRC layer of the first device; and sending, by the relay UE, the RRC message to the second device.

In this optional implementation, based on the foregoing fourth aspect, the method may further include: receiving, by the second device, a radio resource control (RRC) message that is from the first device and that is forwarded by the relay UE, and transmitting the RRC message to the RRC layer of the second device.

In this optional implementation, the base station can directly manage the far-end UE.

According to another aspect, an embodiment of the present invention provides a first device, and the first device has a function of implementing behavior on a first device side in the method provided in any one of the foregoing aspects. The function may be implemented by using hardware, or may be implemented by executing corresponding software by hardware. The hardware or the software includes one or more modules corresponding to the function.

In a possible design, a structure of the first device includes a processor and a transmitter, and the processor is configured to support the first device in performing corresponding functions in the foregoing method. The transmitter is configured to support communication between the first device and relay UE. The first device may further include a memory, and the memory is configured to couple to the processor and store a program instruction and data that are necessary for the first device.

According to still another aspect, an embodiment of the present invention provides relay UE, and the relay UE has a function of implementing behavior on a relay UE side in the method provided in any one of the foregoing aspects. The function may be implemented by using hardware, or may be implemented by executing corresponding software by hardware. The hardware or the software includes one or more modules corresponding to the function.

In a possible design, a structure of the relay UE includes a processor and a transmitter, and the processor is configured to support the relay UE in performing corresponding functions in the foregoing method. The transmitter is configured to support communication between the relay UE and a first device and communication between the relay UE and a second device. The relay UE may further include a memory, and the memory is configured to couple to the processor and stores a program instruction and data that are necessary for the relay UE.

According to yet another aspect, an embodiment of the present invention provides a second device, and the second device has a function of implementing behavior on a second device side in the method provided in any one of the foregoing aspects. The function may be implemented by using hardware, or may be implemented by executing corresponding software by hardware. The hardware or the software includes one or more modules corresponding to the function.

In a possible design, a structure of the second device includes a processor and a transmitter, and the processor is configured to support the second device in performing corresponding functions in the foregoing method. The transmitter is configured to support communication between the second device and relay UE. The second device may further include a memory, and the memory is configured to couple to the processor and store a program instruction and data that are necessary for the second device.

According to still yet another aspect, an embodiment of the present invention provides a computer storage medium, configured to store a computer software instruction used by the foregoing first device. The computer storage medium includes a program designed to perform the foregoing aspects.

According to a further aspect, an embodiment of the present invention provides a computer storage medium, configured to store a computer software instruction used by the foregoing relay UE. The computer storage medium includes a program designed to perform the foregoing aspects.

According to a still further aspect, an embodiment of the present invention provides a computer storage medium, configured to store a computer software instruction used by the foregoing second device. The computer storage medium includes a program designed to perform the foregoing aspects.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

As described in the background, far-end UE and relay UE trust each other. In addition, the far-end UE is invisible for a base station. A "far-end UE and relay UE trust each other" and "the far-end UE is invisible for a base station" are described below from a perspective of a system protocol stack. For example, the far-end UE and the relay UE communicate with each other in a D2D communication manner, a communications interface is a PC5 interface, and a communications interface between the relay UE and the base station is a Uu interface. It should be noted that in a system protocol stack in the prior art, a control plane protocol stack and a user plane protocol stack are not distinguished.

Figure 1:
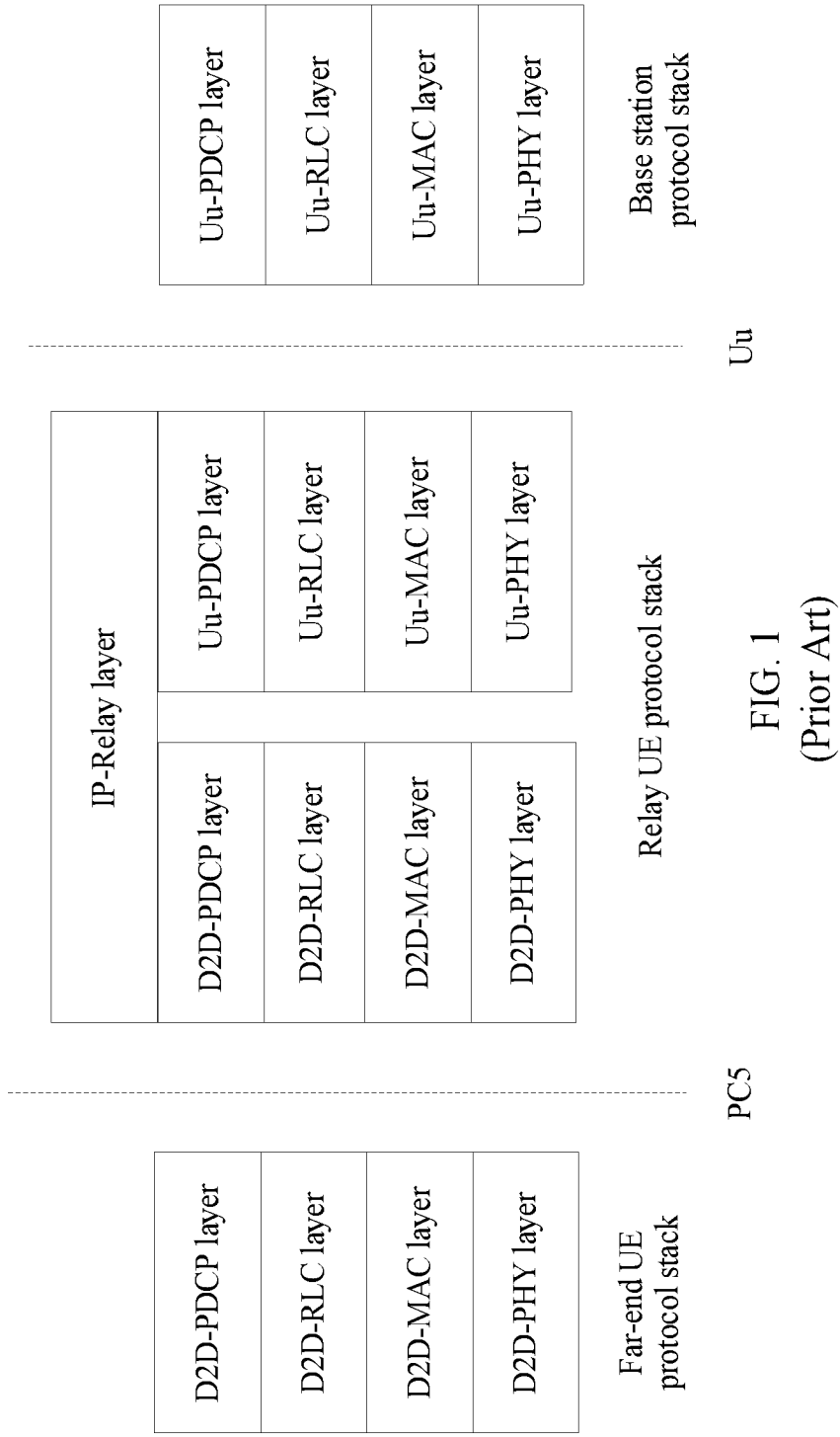
FIG. 1 is a schematic diagram of a system protocol stack in the prior art.

As shown in FIG. 1, FIG. 1 is a schematic diagram of a system protocol stack in the prior art. The system protocol stack includes a far-end UE protocol stack, a relay UE protocol stack, and a base station protocol stack. The far-end UE protocol stack includes an Internet Protocol (IP) layer, a Packet Data Convergence Protocol (PDCP) layer in a D2D communication manner, a Radio Link Control (RLC) layer, a Media Access Control (MAC) layer, and a physical (PHY) layer that are successively set from top to bottom, in other words, a D2D-PDCP layer, a D2D-RLC layer, a D2D-MAC layer, and D2D-PHY layer that are successively set from top to bottom. The relay UE protocol stack includes: a D2D-PDCP layer, a D2D-RLC layer, a D2D-MAC layer, and D2D-PHY layer of a PC5 interface that are a peer to the far-end UE protocol stack, and a Uu-PDCP layer, a Uu-RLC layer, a Uu-MAC layer, and a Uu-PHY layer of a Uu interface, and in addition, an IP-relay layer that is set above the D2D-PDCP layer and the Uu-PDCP layer and that has a forwarding function. The base station protocol stack includes a Uu-PDCP layer, a Uu-RLC layer, a Uu-MAC layer, and a Uu-PHY layer of a Uu interface that are a peer to the relay UE protocol stack. It should be noted that the protocol stack shown in FIG. 1 further includes a radio resource control (RRC) layer between the relay UE and the base station. The radio resource control layer is not shown in FIG. 1.

It may be learned from FIG. 1 that, first, the relay UE protocol stack includes layers that are peers to the layers (except the IP layer) in the far-end UE protocol stack, and therefore the far-end UE and the relay UE trust each other; and second, the far-end UE protocol stack does not include a protocol stack that is a peer to the base station protocol stack, and therefore the far-end UE is invisible for the base station.

As described in the background, because the relay UE can learn of the communication content between the far-end UE and the base station, if information on the relay UE is stolen, the communication content between the far-end UE and the base station may be leaked, and therefore data transmission security is relatively low.

Based on this, technical solutions provided in the embodiments of the present invention provide a data transmission system, method, and apparatus. Peer cellular network PDCP layers are set on the far-end UE and the base station, and security processing is performed on to-be-transmitted data between the far-end UE and the base station separately at the cellular network PDCP layer of the far-end UE and the cellular network PDCP layer of the base station based on a security processing policy agreed on by the far-end UE and the base station, to ensure security of communication data between the far-end UE and the base station.

The technical solutions provided in the embodiments of the present invention may be applied to various communications systems, for example, current 2G and 3G communications systems, and a next-generation communications system, for example, Code Division Multiple Access (CDMA), Wideband Code Division Multiple Access (WCDMA), Time Division Multiple Access (TDMA), Frequency Division Multiple Access (FDMA), Orthogonal Frequency Division Multiple Access (OFDMA), single carrier Frequency Division Multiple Access (single carrier FDMA, SC-FDMA), and Long Term Evolution (LTE) systems, and other communications systems of this type.

The base station (for example, an access point) may be a device that communicates, on an air interface in an access network, with a wireless terminal by using one or more sectors. The base station may be configured to mutually convert a received over-the-air frame and an IP packet and is used as a router between the wireless terminal and a remaining portion of the access network. The remaining portion of the access network may include an Internet Protocol (IP) network. The base station may further coordinate attribute management of the air interface. For example, the base station may be a base transceiver station (BTS) in GSM or CDMA, or may be a NodeB (NodeB) in WCDMA, or may be an evolved NodeB (NodeB or eNB or e-NodeB, evolved NodeB) in LTE. This is not limited in this application.

User equipment may be a wireless terminal or a wired terminal. The wireless terminal may be a device that provides voice and/or data connectivity for a user, a handheld device with a radio connection function, or another processing device connected to a radio modem. The wireless terminal may communicate with one or more core networks by using a radio access network (RAN) (an access portion of a wireless communications network). The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, an access point (AP), a remote terminal, an access terminal, a user terminal, a user agent, or user equipment (UE).

For specific implementation of the relay UE and the far-end UE, refer to the foregoing description of the user equipment. It should be noted that the far-end UE in the embodiments of the present invention may alternatively be a wearable device, for example, a Google glass, a smart band, or a smartwatch.

Words such as "first" and "second" in the embodiments of the present invention are used to distinguish between same items or similar items with basically same functions or purposes. Persons skilled in the art may understand that the words such as "first" and "second" do not limit a quantity and an implementation sequence.

"/" in this specification means "or", for example, A/B may indicate A or B, and "and/or" in this specification is merely an association relationship for describing associated objects, and indicates that there may be three relationships. For example, A and/or B may represent the following three cases: Only A exists, both A and B exist, and only B exists. "A plurality of" means two or more than two.

The word "example" in this specification is used to indicate an example, illustration, or description. Any embodiment or design solution described as an "example" in this application should not be construed as preferable or more advantageous than other embodiments or design solutions. Exactly, the word "for example" is used to present a concept in a specific manner.

A "transmit/receive end-based policy (including a first policy, a second policy, and a third policy)" in this specification is a security processing policy that is agreed on by a transmitter and a receiver in advance and that needs to be satisfied by communication data between the transmitter and the receiver. The transmit end-based policy includes an integrity protection policy and/or an encryption policy, and the receive end-based policy includes a corresponding integrity protection verification policy and/or a corresponding decryption policy. For example, if a transmit end-based first policy includes an encryption policy, a receive end-based policy includes a decryption policy; and if a transmit end-based first policy includes an integrity protection policy, a receive end-based policy includes an integrity protection verification policy.

"Layer" involved in this specification such as a PDCP layer or an RRC layer is a logical function module. "Peer layers" are two layers with a same function, but in one data transmission (including uplink data transmission and downlink data transmission) process, two peer layers implement functions. For example, if an RLC layer of far-end UE implements an encapsulation function, an RLC layer that is of relay UE and that is a peer to the RLC layer of the far-end UE implements a decapsulation function.

"Security processing" in this specification includes integrity protection processing and integrity protection verification processing, and encryption processing and decryption processing. The integrity protection processing and the integrity protection verification processing are peer to peer, to be specific, appear in pairs. If a PDCP layer of a transmit end performs integrity protection on a data packet, a PDCP layer that is of a receive end and that is a peer to the PDCP layer of the transmit end performs integrity protection verification on a received data packet, to obtain the data packet.

The encryption processing and the decryption processing are peer to peer, to be specific, appear in pairs. If a PDCP layer of a transmit end performs encryption processing on a data packet, a PDCP layer that is of a receive end and that is a peer to the PDCP layer of the transmit end performs decryption processing on a received data packet, to obtain the data packet. A network architecture and a service scenario described in the embodiments of the present invention are intended to describe the technical solutions in the embodiments of the present invention more clearly, but are not construed as a limitation on the technical solutions provided in the embodiments of the present invention. Persons of ordinary skill in the art may understand that, with evolution of the network architecture and emergence of a new service scenario, the technical solutions provided in the embodiments of the present invention are also applicable to a similar technical problem.

The embodiments of the present invention are illustrated based on a 4G network scenario in a wireless communications network. It should be noted that the solutions in the embodiments of the present invention may also be applied to another wireless communications network, and a corresponding name may be replaced with a corresponding function name in the another wireless communications network.

The following clearly describes the technical solutions in the embodiments of the present invention with reference to the accompanying drawings in the embodiments of the present invention. Apparently, the described embodiments are merely some but not all of the embodiments of the present invention.

Figure 2:
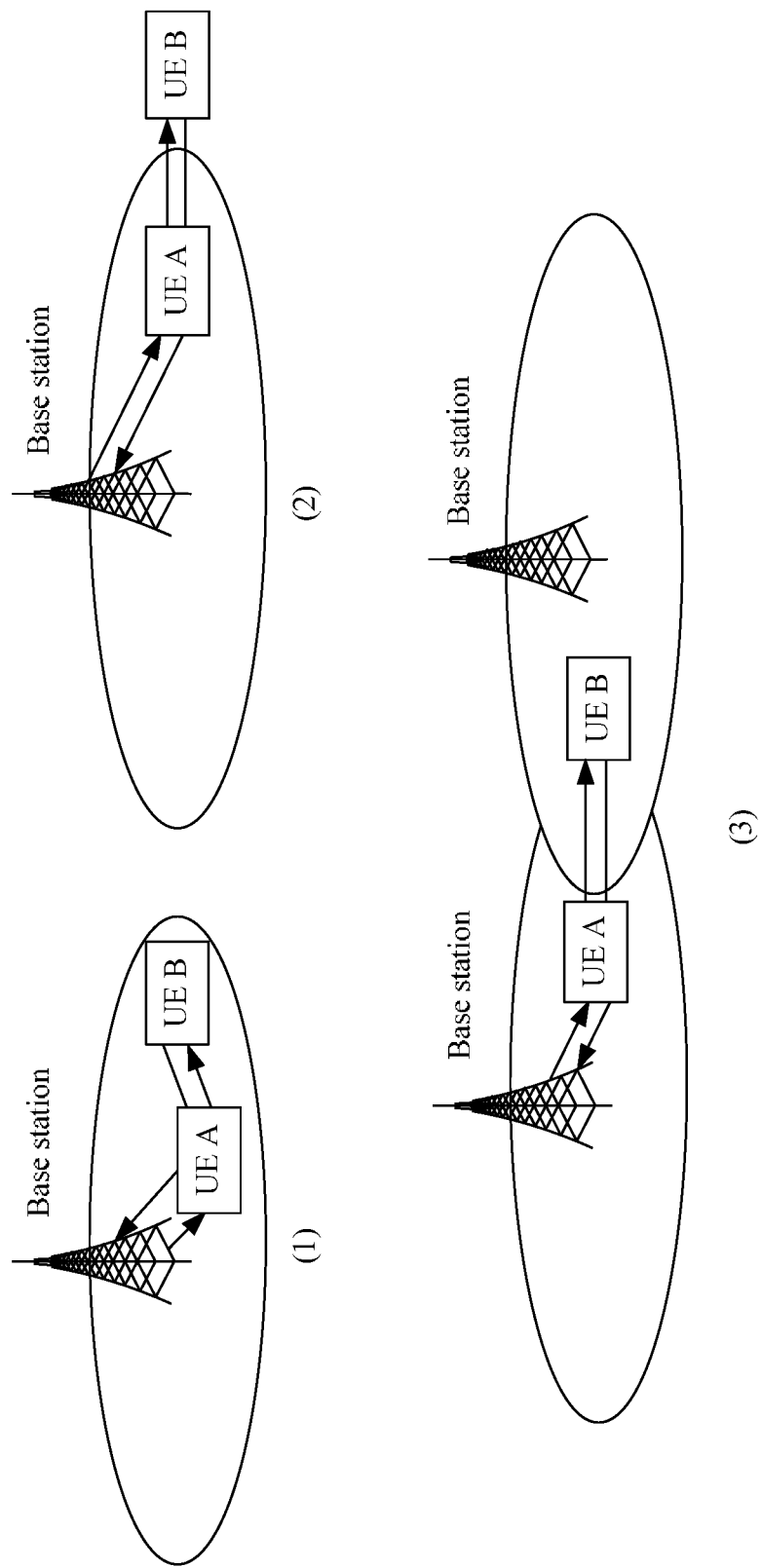
FIG. 2 is a diagram of a system architecture to which the technical solutions provided in the embodiments of the present invention are applicable.

FIG. 2 shows a data transmission system provided in an embodiment of the present invention. The system includes a first device, relay UE, and a second device. The first device is far-end UE, and the second device is a base station; or the first device is a base station, and the second device is far-end UE.

The far-end UE is connected to the base station by using the relay UE, and performs uplink data and/or downlink data transmission with the base station by using the relay UE. FIG. 2 shows a location relationship among the far-end UE, the relay UE, and the base station. The location relationship shown in FIG. 2 includes: Both the relay UE and the far-end UE are located in a cell coverage area, as shown in FIG. 2 (1); the relay UE is located in the cell coverage area, and the far-end UE is located outside the cell coverage area, as shown in FIG. 2 (2); and the relay UE is located in one cell coverage area, and the far-end UE is located in another cell coverage area, as shown in FIG. 2 (3). UE A in FIG. 2 is the relay UE, and UE B is the far-end UE.

The far-end UE and the relay UE may communicate with each other in a D2D communication manner, a Bluetooth communication manner, a WiFi communication manner, or the like. In this specification, that the far-end UE and the relay UE may communicate with each other in a D2D communication manner is mainly used as an example for description.

In a data transmission process, the devices in the system perform the following functions:

The first device performs, at a cellular network PDCP layer of the first device, security processing on to-be-transmitted data based on a transmit end-based first policy, to generate a protocol data unit (PDU), and sends the PDU to the relay UE. The first policy is a security processing policy agreed on by the first device and the second device, and the to-be-transmitted data is data that the first device needs to transmit to the second device.

The relay UE receives the PDU sent by the first device, and sends the PDU to the second device.

The second device receives the PDU sent by the relay UE, and performs, at a cellular network PDCP layer of the second device, security processing on the PDU based on a receive end-based first policy, to obtain the to-be-transmitted data. The cellular network PDCP layer of the first device is a peer to the cellular network PDCP layer of the second device.

If the first device is far-end UE, and the second device is a base station, the foregoing data transmission process is a data transmission process in an uplink direction. If the first device is a base station, and the second device is far-end UE, the foregoing data transmission process is a data transmission process in a downlink direction.

According to the data transmission system provided in this embodiment of the present invention, peer cellular network PDCP layers are set on the far-end UE and the base station, and security processing is performed on to-be-transmitted data between the far-end UE and the base station separately at the cellular network PDCP layer of the far-end UE and the cellular network PDCP layer of the base station based on a security processing policy agreed on by the far-end UE and the base station, to ensure security of communication data between the far-end UE and the base station.

Optionally, the first device is configured to send the PDU to the relay UE successively through the cellular network PDCP layer of the first device and a protocol module of a first interface of the first device. In this case, the relay UE is configured to send the PDU to the second device successively through a protocol module of a first interface of the relay UE and a protocol module of a second interface of the relay UE. The second device is configured to: receive the PDU sent by the relay UE, transmit the PDU to the cellular network PDCP layer of the second device through a protocol module of a second interface of the second device, and perform, at the cellular network PDCP layer of the second device, security processing on the PDU based on the receive end-based first policy, to obtain the to-be-transmitted data.

The protocol module of the first interface of the relay UE is a peer to the protocol module of the first interface of the first device, the protocol module of the second interface of the relay UE is a peer to the protocol module of the second interface of the second device, the first interface is a communications interface between the first device and the relay UE, and the second interface is a communications interface between the relay UE and the second device.

Figure 3:
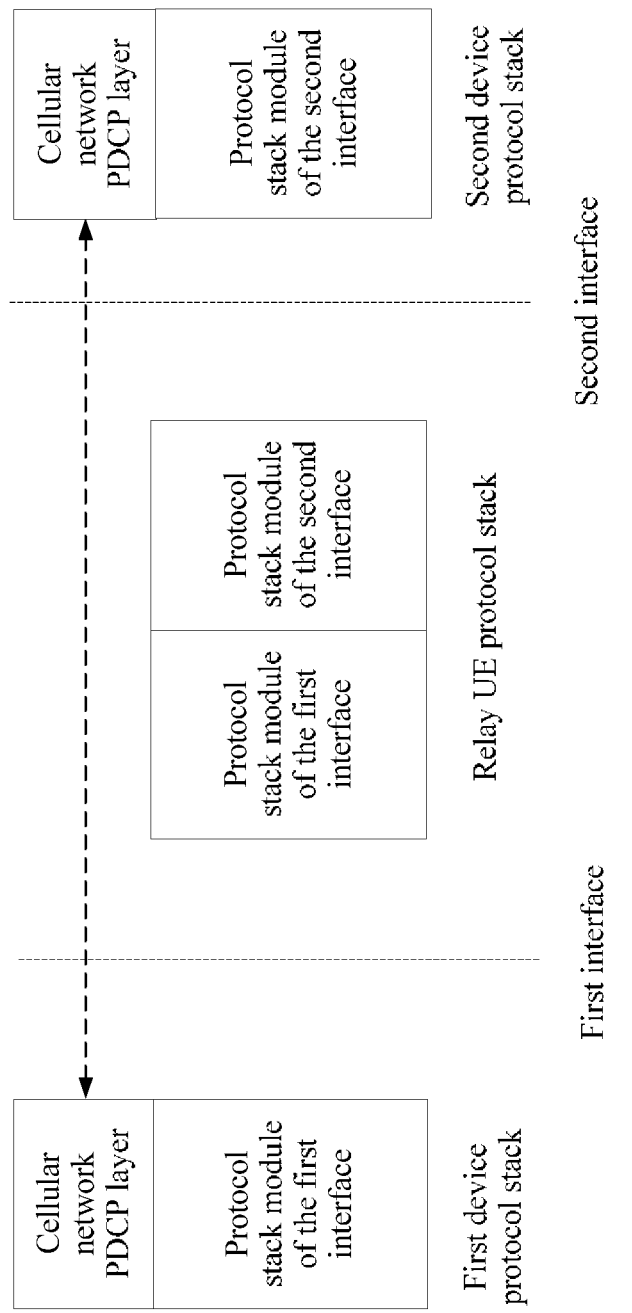
FIG. 3 is a schematic diagram of a system protocol stack according to an embodiment of the present invention.

As shown in FIG. 3, FIG. 3 is a schematic diagram of a system protocol stack provided in this optional implementation. The system protocol stack includes a first device protocol stack, a relay UE protocol stack, and a far-end UE protocol stack.

Figure 4:
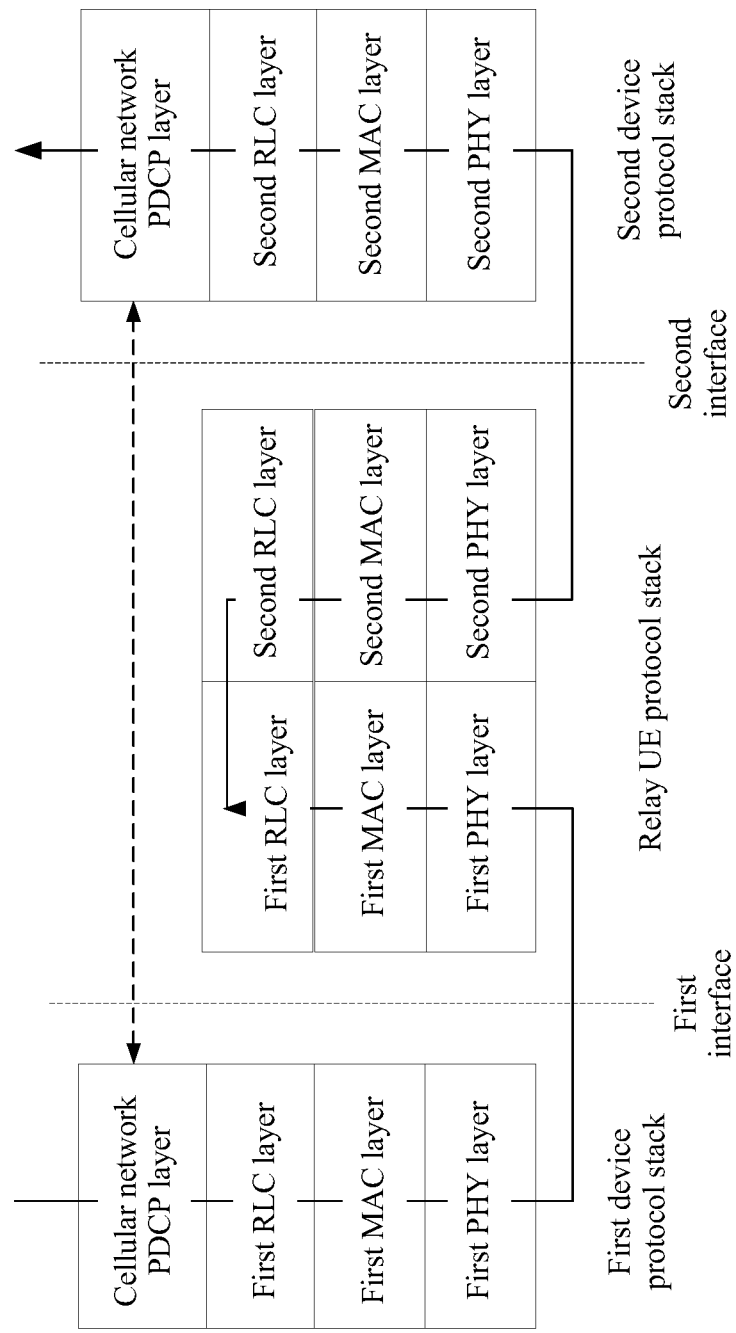
FIG. 4 is a schematic diagram of another system protocol stack according to an embodiment of the present invention.

With reference to FIG. 3, optionally, the protocol module of the first interface may include a first RLC layer, a first MAC layer, and a first PHY layer that are successively set from top to bottom, and the protocol module of the second interface may include a second RLC layer, a second MAC layer, and a second PHY layer that are successively set from top to bottom, as shown in FIG. 4. FIG. 4 further shows a data flow transmission direction.

In FIG. 4, a first RLC layer of the relay UE implements a function of transmitting data to a second RLC layer of the relay UE, and the second RLC layer of the relay UE implements a function of receiving data transmitted by the first RLC layer of the relay UE.

Figure 5:
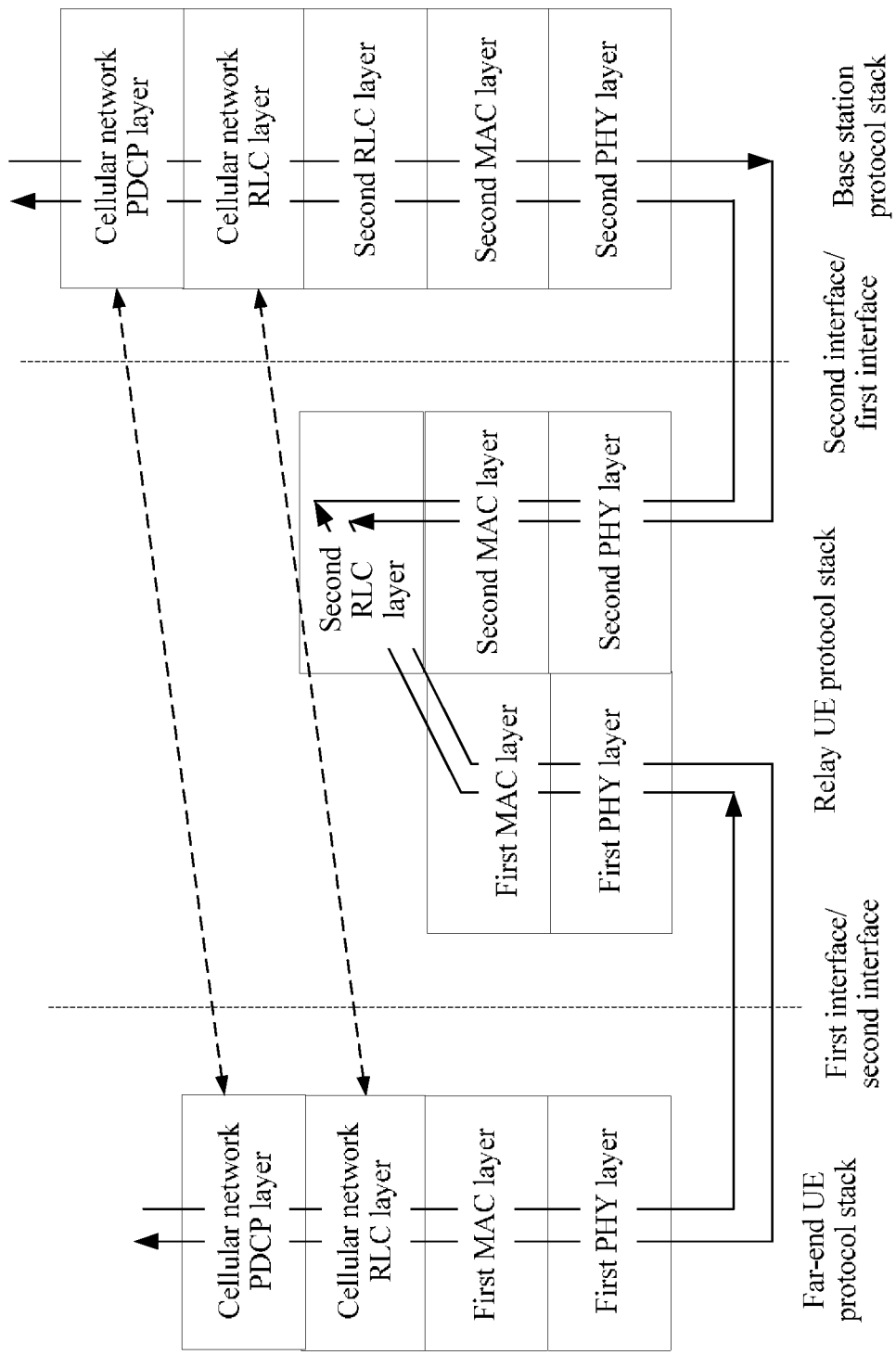
FIG. 5 is a schematic diagram of another system protocol stack according to an embodiment of the present invention.

With reference to FIG. 3, optionally, a protocol module of an interface between the far-end UE and the relay UE includes a MAC layer and a PHY layer (which are represented by a first MAC layer and a first PHY layer in FIG. 5). The interface may be a first interface or a second interface. In other words, in this optional implementation, the first device may be far-end UE or a base station. In this case, the far-end UE and the base station may include peer cellular network RLC layers. As shown in FIG. 5, FIG. 5 further shows a data flow transmission direction.

In FIG. 5, in an uplink direction, the first MAC layer of the relay UE implements a function of sending data to the second RLC layer of the relay UE, and in this case, the second RLC layer of the relay UE implements a function of receiving data sent by the first MAC layer of the relay UE. In a downlink direction, the second RLC layer of the relay UE implements a function of sending data to the first MAC layer of the relay UE, and in this case, the first MAC layer of the relay UE implements a function of receiving data sent by the second RLC layer of the relay UE.

Based on the system protocol stack shown in FIG. 5, the first device is configured to send the PDU to the relay UE successively through the cellular network PDCP layer of the first device, a cellular network RLC layer of the first device, and the protocol module of the first interface of the first device. The second device is configured to: receive the PDU sent by the relay UE, and transmit the PDU to the cellular network PDCP layer of the second device successively through the protocol module of the second interface of the second device and a cellular network RLC layer of the second device. It should be noted that, in this optional implementation, usually no peer first PDCP layers are set on the far-end UE and the base station. Optionally, peer second PDCP layers may be set on the relay UE and the base station. For descriptions of the first PDCP layer and the second PDCP layer, refer to the following description.

Figure 6:
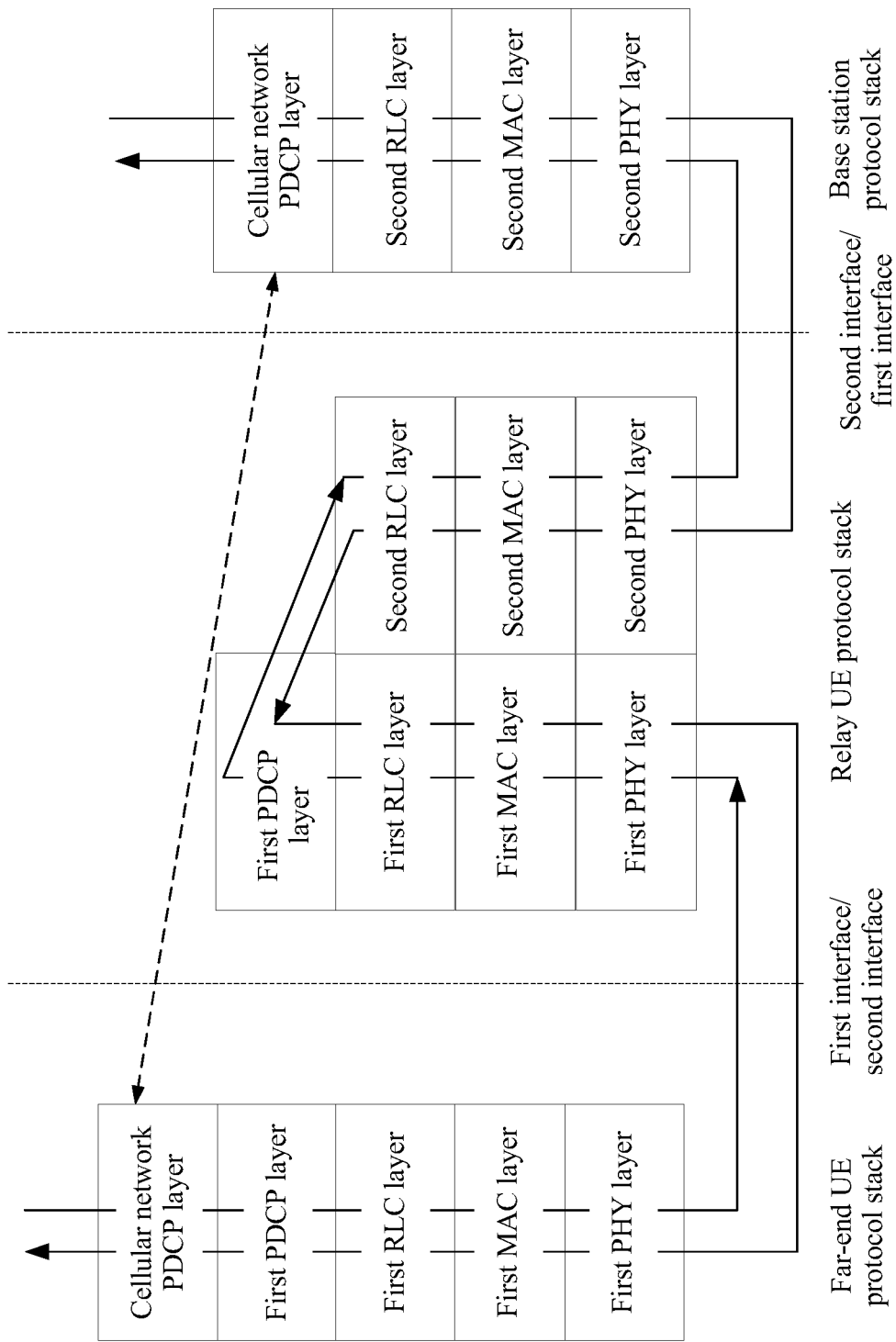
FIG. 6 is a schematic diagram of another system protocol stack according to an embodiment of the present invention.

In an optional implementation 1, a protocol module of an interface between the far-end UE and the relay UE includes a first PDCP layer. The interface may be a first interface or a second interface. In other words, in this optional implementation, the first device may be far-end UE or a base station. The first PDCP layer is configured to perform security processing on data based on a second policy agreed on by the far-end UE and the relay UE. A system protocol stack to which this optional implementation is applicable is shown in FIG. 6, and FIG. 6 is drawn based on FIG. 4. FIG. 6 further shows a data flow transmission direction.

In FIG. 6, in an uplink direction, the first PDCP layer of the relay UE implements a function of sending a data packet to the second RLC layer of the relay UE, and in this case, the second RLC layer of the relay UE implements a function of receiving a data packet sent by the first PDCP layer of the relay UE. In a downlink direction, the second RLC layer of the relay UE implements a function of sending a data packet to the first PDCP layer of the relay UE, and in this case, the first PDCP layer of the relay UE implements a function of receiving a data packet sent by the second RLC layer of the relay UE.

This optional implementation may be applicable to a scenario in which the far-end UE and the relay UE communicate with each other in a D2D communication manner. In this optional implementation, the far-end UE and the relay UE include peer first PDCP layers. In this way, security of data transmission communication between the far-end UE and the relay UE can be ensured. In other words, a third party cannot steal content of exchanged information between the far-end UE and the relay UE by monitoring electromagnetic wave.

Optionally, the first PDCP layer of the far-end UE and the first PDCP layer of the relay UE are configurable. In this case, the devices in the system further perform the following functions: The base station sends a first instruction message to each of the far-end UE and the relay UE, where the first instruction message is used to instruct a receiver to establish the first PDCP layer; the far-end UE receives the first instruction message sent by the base station, and establishes the first PDCP layer on the far-end UE based on the first instruction message; and the relay UE receives the first instruction message sent by the base station, and establishes the first PDCP layer on the relay UE based on the first instruction message.

The first PDCP layer is configured for each of the far-end UE and the relay UE, or is configured for neither the far-end UE nor the relay UE. A condition for triggering the base station to configure the first PDCP layer for the far-end UE and the relay UE is not limited in this embodiment of the present invention.

Figure 7:
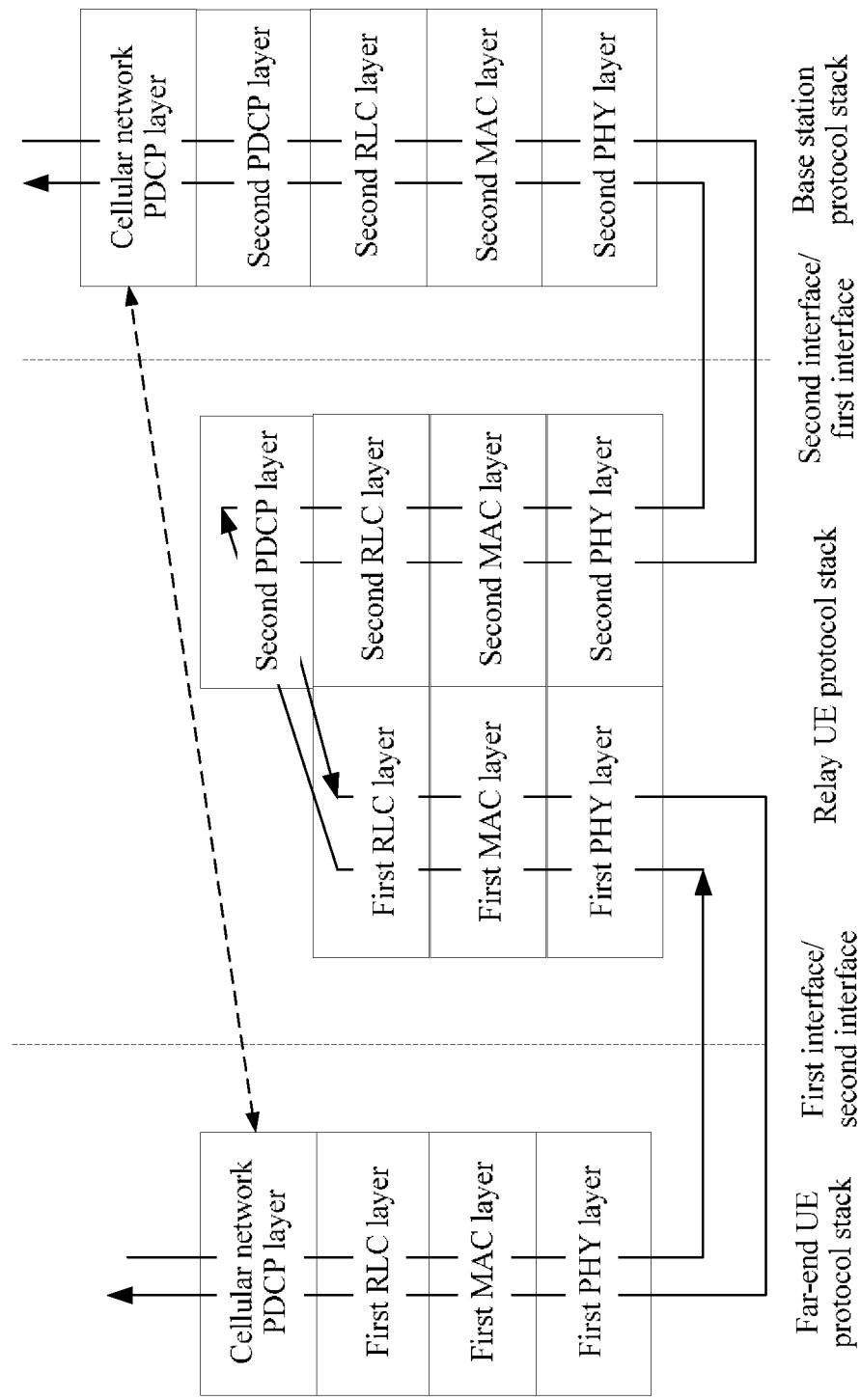
FIG. 7 is a schematic diagram of another system protocol stack according to an embodiment of the present invention.
Figure 8:
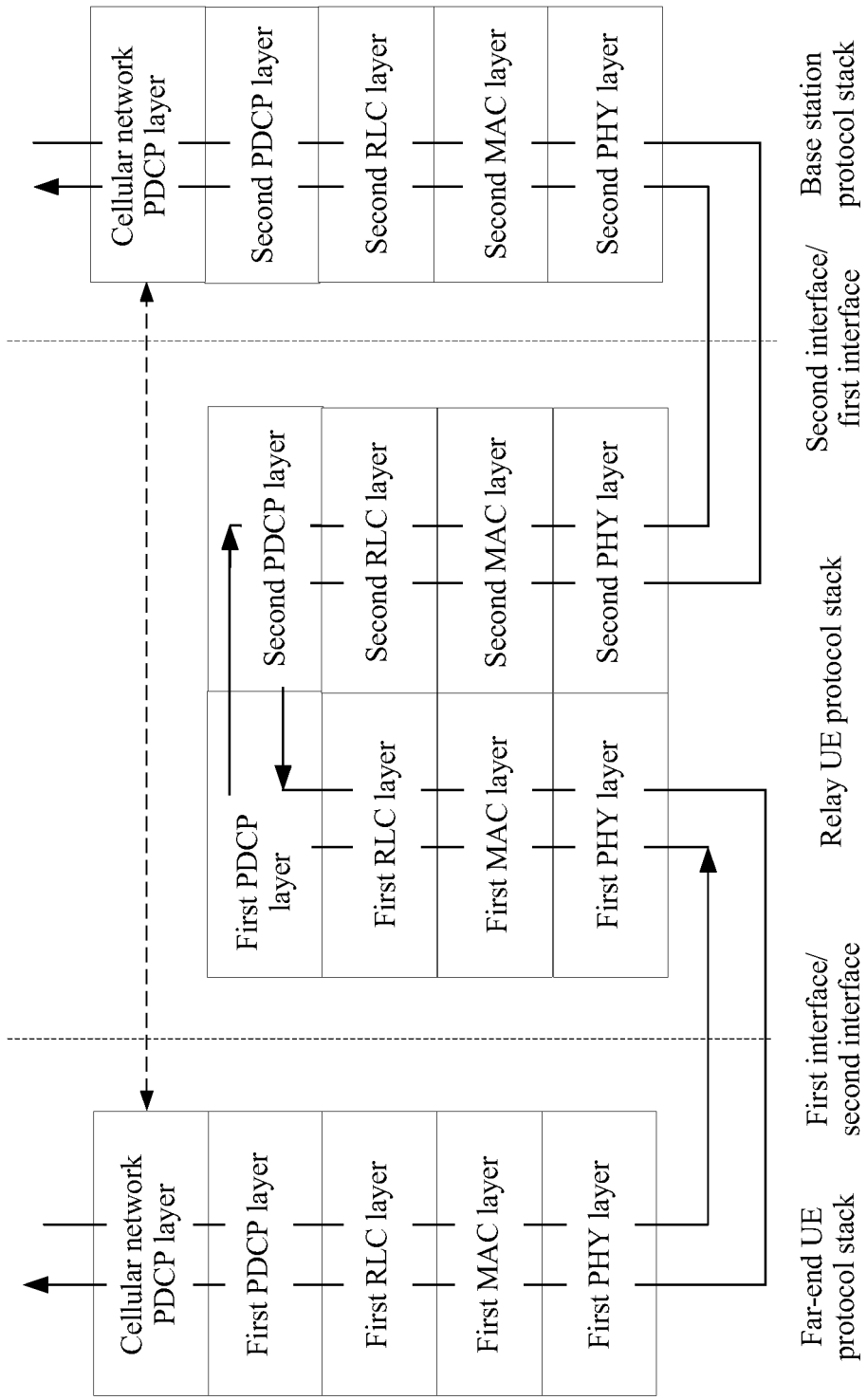
FIG. 8 is a schematic diagram of another system protocol stack according to an embodiment of the present invention.

In an optional implementation 2, a protocol module of an interface between the relay UE and the base station includes a second PDCP layer. The interface may be a first interface or a second interface. In other words, in this optional implementation, the first device may be far-end UE or a base station. The second PDCP layer is configured to perform security processing on data based on a third policy agreed on by the relay UE and the base station. A system protocol stack to which this optional implementation is applicable is shown in FIG. 7 or FIG. 8. FIG. 7 is drawn based on FIG. 4, FIG. 8 is drawn based on FIG. 6, and FIG. 7 and FIG. 8 further show data flow transmission directions.

In FIG. 7, in an uplink direction, the first RLC layer of the relay UE implements a function of sending a data packet to the second PDCP layer of the relay UE, and in this case, the second PDCP layer of the relay UE implements a function of receiving a data packet sent by the first RLC layer of the relay UE. In a downlink direction, the second PDCP layer of the relay UE implements a function of sending a data packet to the first RLC layer of the relay UE, and in this case, the first RLC layer of the relay UE implements a function of receiving a data packet sent by the second PDCP layer of the relay UE.

In FIG. 8, in an uplink direction, the first PDCP layer of the relay UE further implements a function of sending a data packet to the second PDCP layer of the relay UE, and in this case, the second PDCP layer of the relay UE further implements a function of receiving a data packet sent by the first PDCP layer of the relay UE. In a downlink direction, the second PDCP layer of the relay UE further implements a function of sending a data packet to the first PDCP layer of the relay UE, and in this case, the first PDCP layer of the relay UE further implements a function of receiving a data packet sent by the second PDCP layer of the relay UE.

In this optional implementation, the relay UE protocol stack and the base station protocol stack include peer second PDCP layers. In this way, security of data transmission communication between the relay UE and the base station can be ensured. In other words, a third party cannot steal content of exchanged information between the relay UE and the base station by monitoring electromagnetic wave.

Optionally, the second PDCP layer of the relay UE and the second PDCP layer of the base station are configurable. In this case, the devices in the system further perform the following functions: The base station establishes the second PDCP layer, and sends a second instruction message to the relay UE, where the second instruction message is used to instruct the relay UE to establish the second PDCP layer; and the relay UE receives the second instruction message sent by the base station, and establishes the second PDCP layer on the relay UE based on the second instruction message.

The second PDCP layer is configured for each of the relay UE and the base station, or is configured for neither the relay UE nor the base station. A condition for triggering the base station to configure the second PDCP layer for the relay UE and the base station is not limited in this embodiment of the present invention.

In an optional implementation, the devices in the system may further have the following functions: The first device generates an RRC message at an RRC layer of the first device, and sends the RRC message to the relay UE; the relay UE receives the RRC message, and sends the RRC message to the second device; and the second message receives the RRC message sent by the relay UE, and transmits the RRC message to an RRC layer of the second device. The RRC layer of the first device is a peer to the RRC layer of the second device, the RRC layer of the first device is above the cellular network PDCP layer of the first device, and the RRC layer of the second device is above the RRC layer of the second device.

Figure 9:
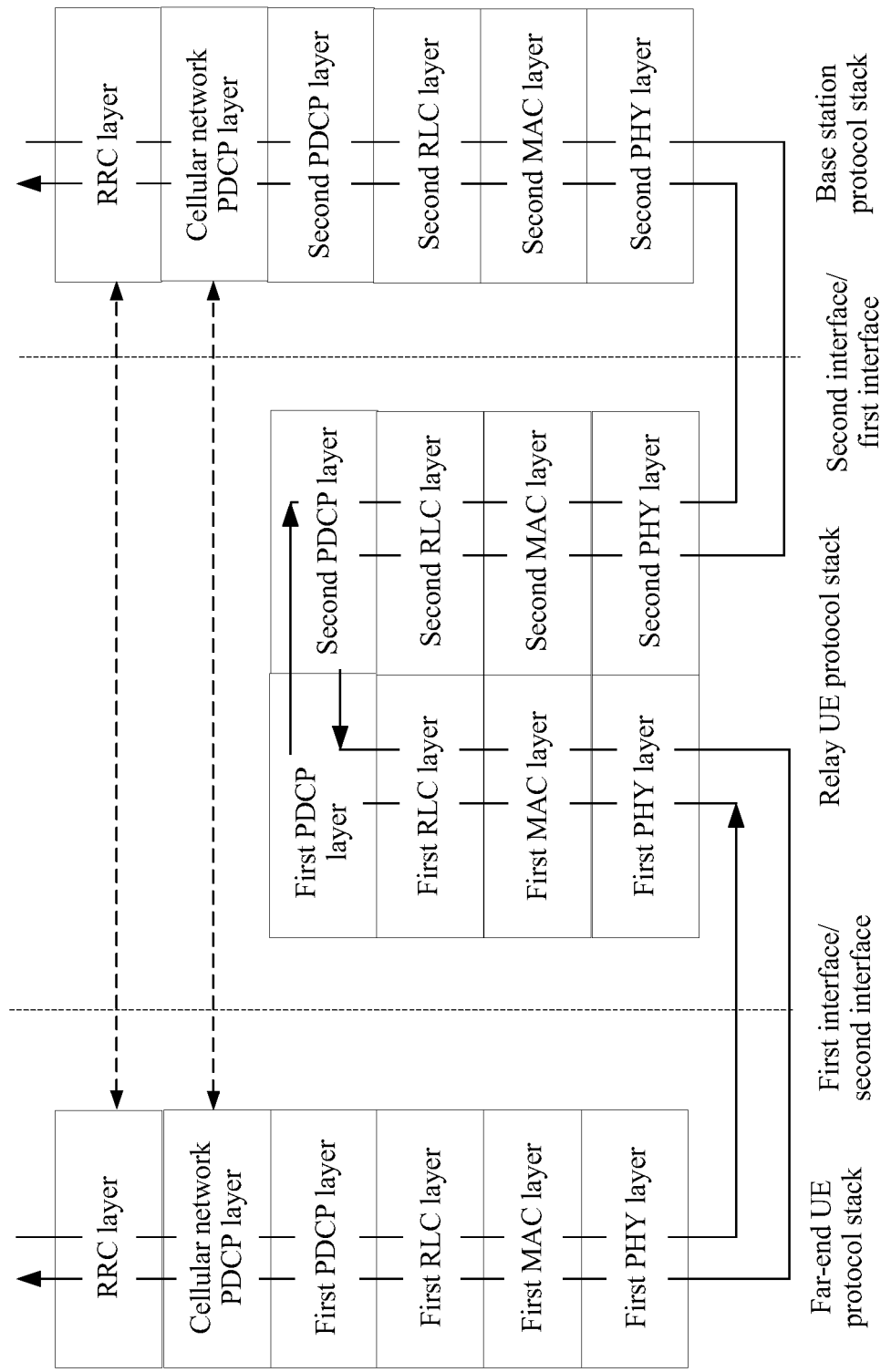
FIG. 9 is a schematic diagram of another system protocol stack according to an embodiment of the present invention.

A system protocol stack to which this optional implementation is applicable is shown in FIG. 9, and FIG. 9 is drawn based on FIG. 8. FIG. 9 further shows a data flow transmission direction.

The RRC message may include but is not limited to an RRC request message, an RRC response message, an RRC acknowledgment message, an RRC instruction message, and the like, for example, an RRC connection request message, an RRC connection reestablishment request message, a security mode request message, an uplink direct transmission request message, or a downlink direct transmission (downlink direct transmission) request message.

In this optional implementation, the cellular network PDCP layer is configured to: process the RRC message, for example, a function of adding a sequence number (SN) to or removing an SN from an RRC connection establishment request message; or send a data packet to a lower protocol layer instead of modifying the data packet; or perform integrity protection or integrity protection verification on control signaling.

The system protocol stack shown in FIG. 9 may be referred to as a control plane protocol stack. Because the far-end UE protocol stack and the base station protocol stack include peer RRC layers, an RRC connection between the far-end UE and the base station can be implemented, so that the far-end UE is visible for the base station. In this way, the base station can directly manage the far-end UE, and configure a control plane parameter and a user plane parameter of the RRC connection for the far-end UE. In addition, for a device in a core network, such as a mobility management entity (MME), a packet data network gateway (PGW), or an SGW, the far-end UE is UE that is directly connected to the base station (for example, directly connected by using a Uu interface). Management performed on the far-end UE by the core network is the same as management performed on the far-end UE by the core network without using the relay UE.

That the base station configures a control plane parameter and a user plane parameter of the RRC connection for the far-end UE may include: On a control plane, peer RRC layers and peer cellular network PDCP layers are set on the far-end UE and the base station, and the RRC layer is responsible for managing parameter configuration of an access link of the far-end UE, setting up a bearer (including an accessed radio bearer and a bearer from the base station to the core network) of the far-end UE, configuring transmission data from the far-end UE to the base station and a security parameter of signaling, or the like; on a user plane, for example, based on the user plane protocol stack shown in FIG. 6, for uplink data transmission, the far-end UE processes, at the cellular network PDCP layer, a data packet from an upper layer, and then forwards the processed data packet to the base station, and for downlink data transmission, the base station sends a data packet from the core network to the cellular network PDCP layer for processing, and then forwards the processed data packet to the far-end UE by using the relay UE.

In the control plane protocol stack shown in FIG. 9, for the base station, RRC context information of the far-end UE, especially the security parameter, is directly managed by the base station. In addition, processing of the control signaling and security processing (including integrity protection, encryption and decryption, and the like) of the data packet are completed only by the base station and the far-end UE. In this way, in a process in which the far-end UE exchanges information with the base station by using any relay UE, the relay UE cannot decrypt content of the exchanged information, so that data transmission security can be improved.

Figure 10:
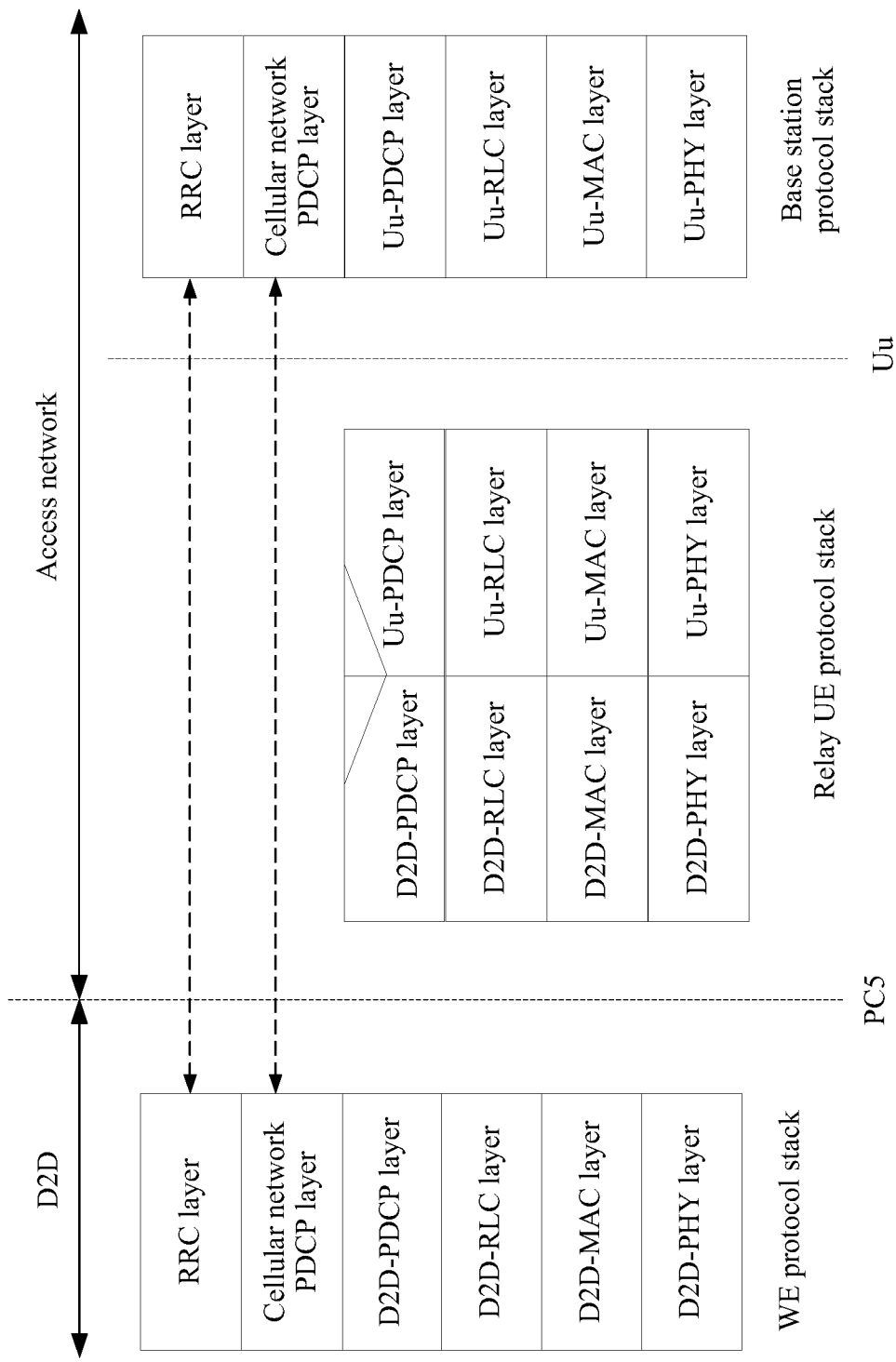
FIG. 10 is a schematic diagram of another system protocol stack according to an embodiment of the present invention.

For example, it is assumed that a communications interface between the far-end UE and the relay UE is a PC5 interface, the far-end UE and the relay UE communicate with each other in a D2D communication manner, and a communications interface between the relay UE and the base station is a Uu interface. A schematic diagram of a system protocol stack based on FIG. 9 is shown in FIG. 10. In FIG. 10, an access network may be an evolved UMTS terrestrial radio access network (E-UTRAN). UMTS is an abbreviation for a universal mobile telecommunications system.

Functions of layers in the system protocol stack are described by using FIG. 10 as an example.

1. A far-end UE protocol stack includes an RRC layer, a cellular network PDCP layer, and a D2D protocol module.

RRC layer: A function to be completed by the RRC layer is to enable far-end UE to connect to a network device (such as a subset of a base station) directly by using a Uu interface, and at least includes: (1) Establish, release, and modify an RRC connection. (2) Allocate, modify, and obtain an identity (ID) such as a cell radio network temporary identifier (C-RNTI). (3) Set up, release, and modify a signaling radio bearer (SRB) between the far-end UE and the base station. (4) Configure a security parameter between the far-end UE and the base station, to facilitate subsequent signaling and data security processing.

Cellular network PDCP layer: is to implement an integrity protection and/or integrity protection verification function for RRC signaling, a robust header compression (ROHC) and decompression function for an IP data packet, and an encryption and/or decryption function for an IP data packet.

The D2D protocol module includes a D2D-PDCP layer, a D2D-RLC layer, a D2D-MAC layer, and a D2D-PHY layer.

The D2D-PDCP layer is to implement a PDCP function at a D2D link layer, and implements at least the header compression and decompression function for an IP data packet and the encryption and/or decryption function for a data packet. Optionally, when there are peer control modules on devices on two sides of the D2D link, the function of integrity protection needs to be performed at the D2D-PDCP layer when the control modules transfer signaling configuration data.

The D2D-RLC layer is a data transmission control layer of a D2D link, and implements data packet encapsulation, division, recombination, retransmission, flow control, and the like.

The D2D-MAC layer is a Media Access Control layer of a D2D link, and implements a function of encapsulating an RLC service data unit (SDU) into a MAC PDU and a function of implementing reliable transmission and retransmission with a peer end of the D2D link, for example, a hybrid automatic repeat request (HARQ) function.

The D2D-PHY layer is configured to: generate an over-the-air radio signal based on a technology specification of a physical layer of a D2D link by using a MAC PDU from the D2D-MAC layer, and send the over-the-air radio signal, and/or receive an over-the-air radio signal and transfer a received correct data packet to the D2D-MAC layer as a MAC PDU.

2. A relay UE protocol stack includes a D2D protocol module and a Uu interface module.

The D2D protocol module is a D2D protocol module that is a peer to far-end UE.

In addition to the functions of the D2D-PDCP layer in the far-end UE protocol stack, a D2D-PDCP layer may include the following functions: a function of sending a data packet to a Uu-PDCP layer or a Uu-RLC layer in the relay UE protocol stack, or a function of receiving a data packet sent by a Uu-PDCP layer or a Uu-RLC layer in the relay UE protocol stack and processing the received data packet, to implement a function of sending the data packet to the far-end UE by using a D2D link.

In addition to the functions of the D2D-RLC layer in the far-end UE protocol stack, a D2D-RLC layer may have the following functions: receiving a data packet sent by a Uu-PDCP layer or a Uu-RLC layer of relay UE and/or sending a data packet to the Uu-PDCP layer or the Uu-RLC layer of the relay UE.

Functions of a D2D-MAC layer and a D2D-PHY layer are the same as functions of peer layers in the far-end UE protocol stack.

The Uu interface module includes a Uu-PDCP layer, a Uu-RLC layer, a Uu-MAC layer, and a Uu-PHY layer.

A Uu-PDCP module in this embodiment of the present invention is the same as a Uu-PDCP module (shown in FIG. 1) included in the relay UE in the prior art, but the two Uu-PDCP modules transmit different content. The Uu-PDCP module included in the relay UE in the prior art transmits information exchanged between the relay UE and the base station, and the Uu-PDCP module included in the relay UE in this embodiment of the present invention transmits information exchanged between the far-end UE and the base station.

The PDCP layer (including the D2D-PDCP layer and the Uu-PDCP layer) of the relay UE in this embodiment of the present invention differs from the PDCP layer of the relay UE in the prior art in that: An uplink data packet at the PDCP layer of the relay UE in this embodiment of the present invention is finally transferred to a cellular network PDCP layer of the base station, and a downlink data packet is finally transferred to a cellular network PDCP layer of the far-end UE, while an uplink data packet at the PDCP layer of the relay UE in the prior art is finally transferred to a PDCP layer (not shown in FIG. 1) that is of the base station and that is corresponding to the relay UE, and a downlink data packet is finally transferred to an RLC layer of the far-end UE.

In addition, the Uu-PDCP layer of the relay UE in this embodiment of the present invention may further have the following functions: a function of receiving a data packet sent by the D2D-PDCP layer or the D2D-RLC layer of the relay UE, and/or a function of sending a data packet to the D2D-PDCP layer or the D2D-RLC layer of the relay UE. The Uu-RLC layer of the relay UE may further have the following functions: a function of receiving a data packet sent by the D2D-PDCP layer of the relay UE, and/or a function of sending a data packet to the D2D-PDCP layer of the relay UE.

3. A base station protocol stack includes a radio bearer module (namely, a Uu interface module) that is a peer to the relay UE protocol stack and an RRC layer and a cellular network PDCP layer that are a peer to the far-end UE.

A cellular network PDCP layer that is of a base station and that is a peer to the far-end UE may have the following functions: a function of receiving a data packet sent by a Uu-PDCP layer or a Uu-RLC layer that is of the base station and that is a peer to relay UE, and/or a function of sending a data packet to the Uu-PDCP layer or the Uu-RLC layer that is of the base station and that is a peer to the relay UE.

It should be noted that in any system protocol stack shown in FIG. 3 to FIG. 8, an IP layer may be further set above the cellular network PDCP layer of the far-end UE. In this case, a data transmission system may further include a serving gateway (SGW), and the SGW includes an IP layer that is a peer to the IP layer of the far-end UE. The IP layer of the far-end UE is configured to generate to-be-transmitted data in an uplink direction, and the IP layer of the SGW is configured to generate to-be-transmitted data in a downlink direction.

An uplink data transmission method provided in the embodiments of the present invention is shown in Embodiment 1 to Embodiment 4. The first device in this specification is far-end UE in Embodiment 1 to Embodiment 4, and the second device in this specification is a base station in Embodiment 1 to Embodiment 4.

Embodiment 1

Figure 11:
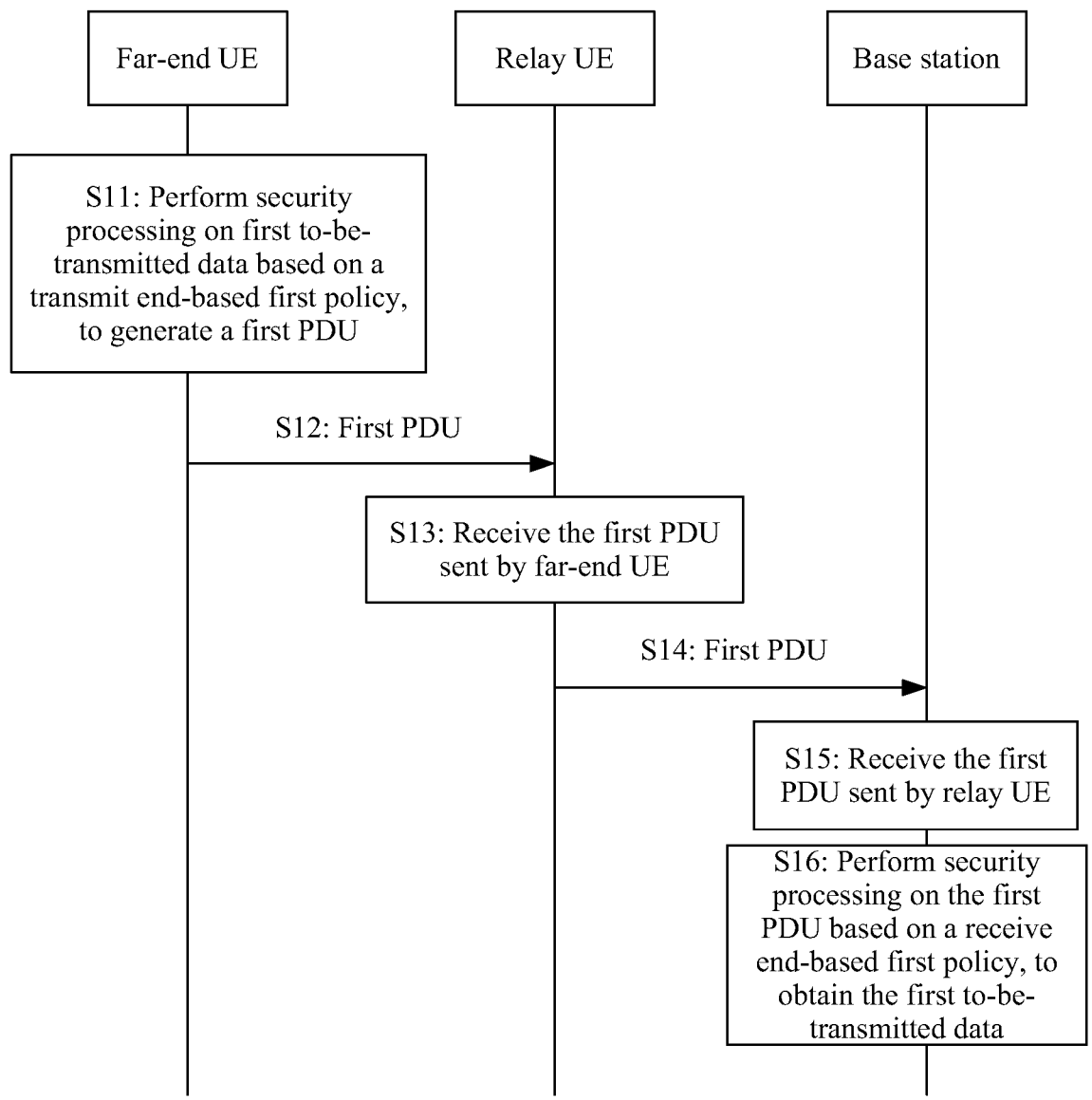
FIG. 11 is an interaction diagram of a data transmission method according to an embodiment of the present invention.

As shown in FIG. 11, FIG. 11 is a schematic interaction diagram of an uplink data transmission method according to an embodiment of the present invention. The method provided in this embodiment may be based on any system protocol stack in FIG. 3 to FIG. 5. In a specific example in this embodiment, the system protocol stack shown in FIG. 4 is used as an example for description. The method shown in FIG. 11 includes the following steps.

S11: Far-end UE performs security processing on to-be-transmitted data based on a transmit end-based first policy, to generate a first PDU. The first policy is a security policy agreed on by the far-end UE and a base station, and the to-be-transmitted data is data sent by the far-end UE to the base station.

A cellular network PDCP layer of the far-end UE receives the to-be-transmitted data sent by an IP layer, and performs security processing on the to-be-transmitted data based on the transmit end-based first policy, to generate the first PDU.

For example, an implementation method of a negotiation process of the first policy is: After receiving an RRC connection establishment request sent by the far-end UE, the base station obtains a security parameter of the far-end UE based on an identifier of the far-end UE, where the security parameter includes an encryption algorithm, a random number, an integrity protection algorithm, and the like; and the base station generates an RRC message by using the obtained security parameter, and sends the RRC message to the far-end UE, and after receiving the RRC message, the far-end UE determines that the first policy is used. This does not constitute a limitation during specific implementation.

S12: The far-end UE sends the first PDU to relay UE.

The cellular network PDCP layer of the far-end UE sends the first PDU to a first RLC layer of the far-end UE, and then the first PDU is finally sent to an air interface of a first interface of the far-end UE successively through the first RLC layer, a first MAC layer, and a first PHY layer of the far-end UE, and the far-end UE sends, on the air interface of the first interface to the relay UE, the first PDU transmitted from the first PHY layer.

S13: The relay UE receives the first PDU sent by the far-end UE.

The relay UE receives, on an air interface of a first interface, the first PDU sent by the far-end UE. After this step, the first PDU is forwarded from a first RLC layer to a second RLC layer successively through a first PHY layer, a first MAC layer, and the first RLC layer of the relay UE, and a radio wave signal is generated after the PDU successively passes through a second MAC layer and a second PHY layer.

S14: The relay UE sends the first PDU to the base station.

The relay UE sends, on an air interface of a second interface to the base station, the radio wave signal generated based on the first PDU.

S15: The base station receives the first PDU sent by the relay UE.

The base station receives, on an air interface of a second interface, the radio wave signal sent by the relay UE, and generates the first PDU after sending the radio wave signal successively through a second PHY layer, a second MAC layer, and a second RLC layer of the base station. After this step, the method may further include: The second RLC layer of the base station sends the first PDU to a cellular network PDCP layer of the base station.

S16: The base station performs security processing on the first PDU based on a receive end-based first policy, to obtain the to-be-transmitted data.

The cellular network PDCP layer of the base station performs security processing on the first PDU based on the receive end-based first policy, to obtain the to-be-transmitted data.

Embodiment 2

Figure 12:
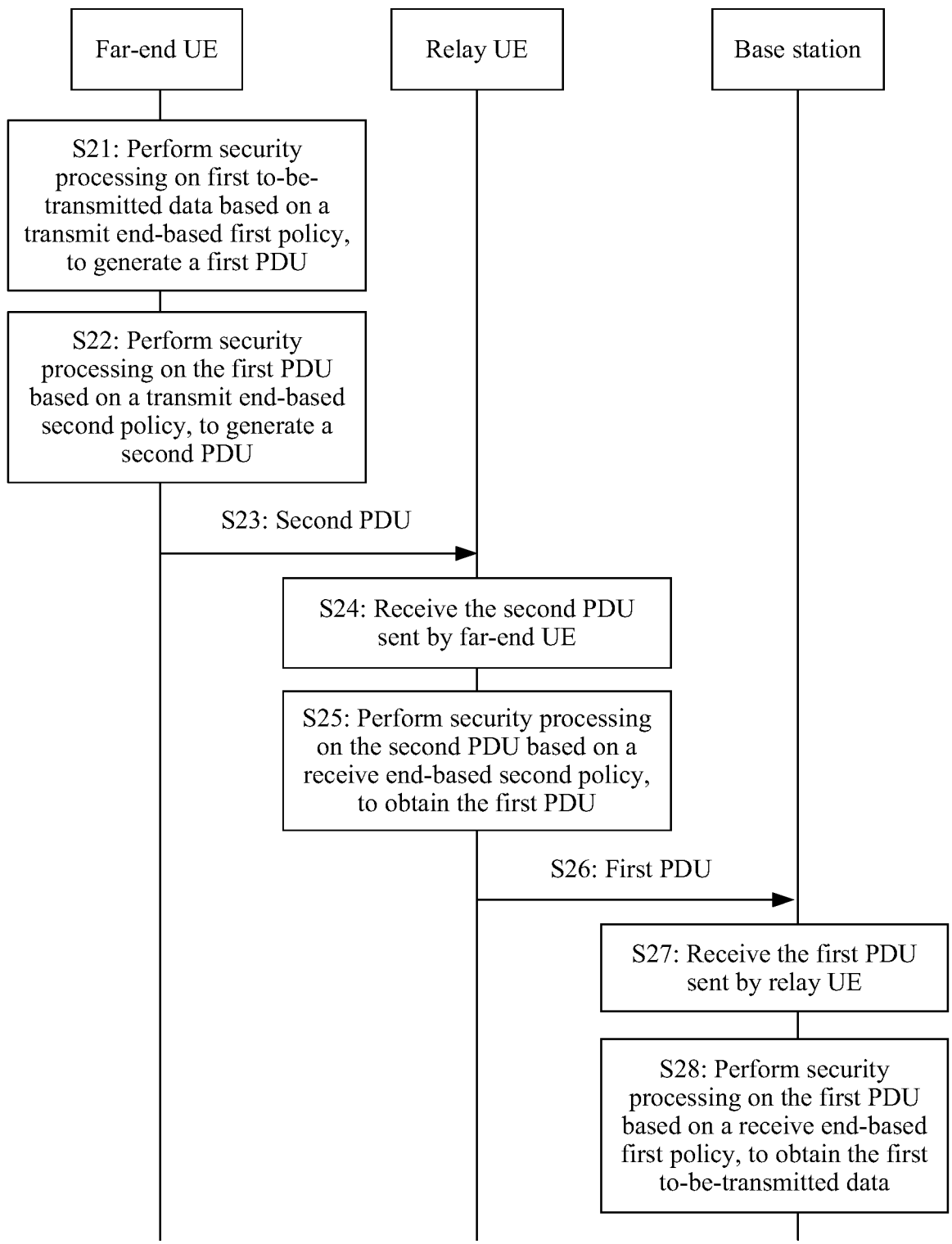
FIG. 12 is an interaction diagram of another data transmission method according to an embodiment of the present invention.

As shown in FIG. 12, FIG. 12 is a schematic interaction diagram of an uplink data transmission method according to an embodiment of the present invention. The method provided in this embodiment may be based on the system protocol stack shown in FIG. 6. To be specific, peer first PDCP layers are set in a far-end UE protocol stack and a relay UE protocol stack. The method shown in FIG. 12 includes the following steps.

S21: Same as S11. After a step in a specific example of S11, the method may further include: A cellular network PDCP layer of the far-end UE sends the first PDU to a first PDCP layer of the far-end UE.

S22: The far-end UE performs security processing on the first PDU based on a transmit end-based second policy. The second policy is a security processing policy agreed on by the far-end UE and relay UE.

The first PDCP layer of the far-end UE performs security processing on the first PDU based on the transmit end-based second policy. After this step, the method may further include: The first PDCP layer of the far-end UE sends a second PDU to a first RLC layer of the far-end UE, and then the second PDU is finally sent to an air interface of a first interface of the far-end UE successively through the first RLC layer, a first MAC layer, and a first PHY layer of the far-end UE.

S23: The far-end UE sends a second PDU to the relay UE.

The far-end UE sends, on the air interface of the first interface, the second PDU to the relay UE.

S24: The relay UE receives the second PDU sent by the far-end UE.

The relay UE receives, on an air interface of a first interface, the second PDU sent by the far-end UE. After this step, the second PDU is forwarded from a first RLC layer to a first PDCP layer of the relay UE successively through a first PHY layer, a first MAC layer, and the first RLC layer of the relay UE.

S25: The relay UE performs security processing on the second PDU based on a receive end-based second policy, to obtain the first PDU.

The first PDCP layer of the relay UE performs security processing on the second PDU based on the receive end-based second policy, to obtain the first PDU. After this step, the method may further include: The first PDCP layer of the relay UE sends the first PDU to a second RLC layer of the relay UE, and then generates a radio wave signal after the first PDU successively passes through a second MAC layer and a second PHY layer of the relay UE.

S26 to S28: Same as S14 to S16.

Embodiment 3

Figure 13:
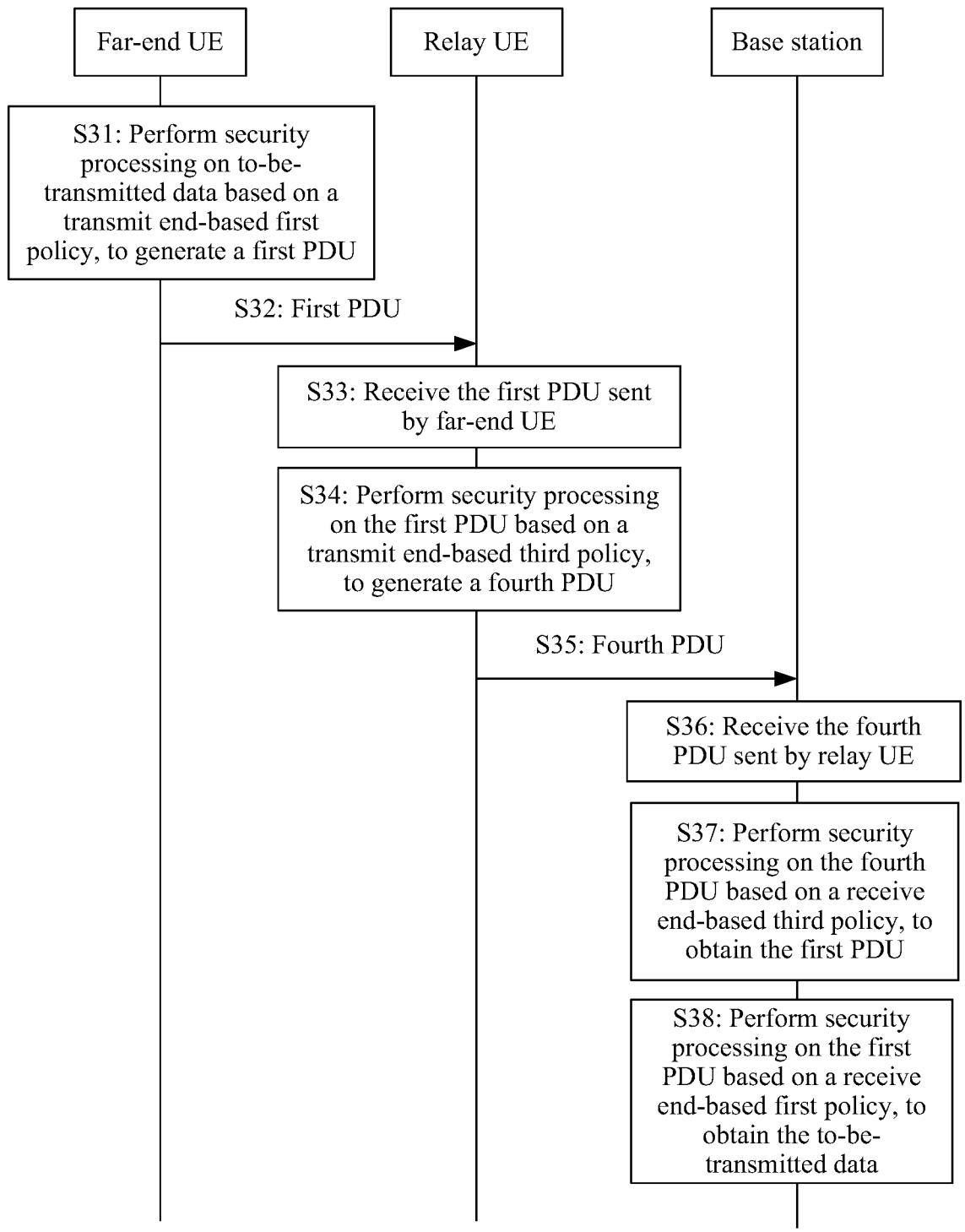
FIG. 13 is an interaction diagram of another data transmission method according to an embodiment of the present invention.

As shown in FIG. 13, FIG. 13 is a schematic interaction diagram of an uplink data transmission method according to an embodiment of the present invention. The method provided in this embodiment may be based on the system protocol stack shown in FIG. 7. To be specific, peer second PDCP layers are set in a relay UE protocol stack and a base station protocol stack. The method shown in FIG. 13 includes the following steps.

S31 to S33: Same as S11 to S13. After a step shown in specific implementation of S13, the first PDU is forwarded from a first RLC layer of the relay UE to a second PDCP layer of the relay UE successively through a first PHY layer, a first MAC layer, and the first RLC layer of the relay UE.

S34: The relay UE performs security processing on the first PDU based on a transmit end-based third policy, to generate a fourth PDU. The third policy is a security processing policy agreed on by the relay UE and the base station.

The second PDCP layer of the relay UE performs security processing on the first PDU based on the transmit end-based third policy, to generate the fourth PDU. After this step, the second PDCP layer of the relay UE forwards the fourth PDU to a second RLC layer of the relay UE, and generates a radio wave signal after the fourth PDU successively passes through a second MAC layer and a second PHY layer of the relay UE.

S35: The relay UE sends the fourth PDU to the base station.

The relay UE sends, on an air interface of a second interface to the base station, the radio wave signal generated based on the fourth PDU.

S36: The base station receives the fourth PDU sent by the relay UE.

The base station receives, on an air interface of a second interface, the fourth PDU sent by the relay UE. After this step, the fourth PDU is sent from a second RLC layer of the base station to a second PDCP layer of the base station successively through a second PHY layer, a second MAC layer, and the second RLC layer of the base station.

S37: The base station performs security processing on the fourth PDU based on a receive end-based third policy, to obtain the first PDU.

The second PDCP layer of the base station performs security processing on the fourth PDU based on the receive end-based third policy, to obtain the first PDU. After this step, the second PDCP layer of the base station sends the first PDU to a cellular network PDCP layer of the base station.

S38: Same as S16.

Embodiment 4

Figure 14:
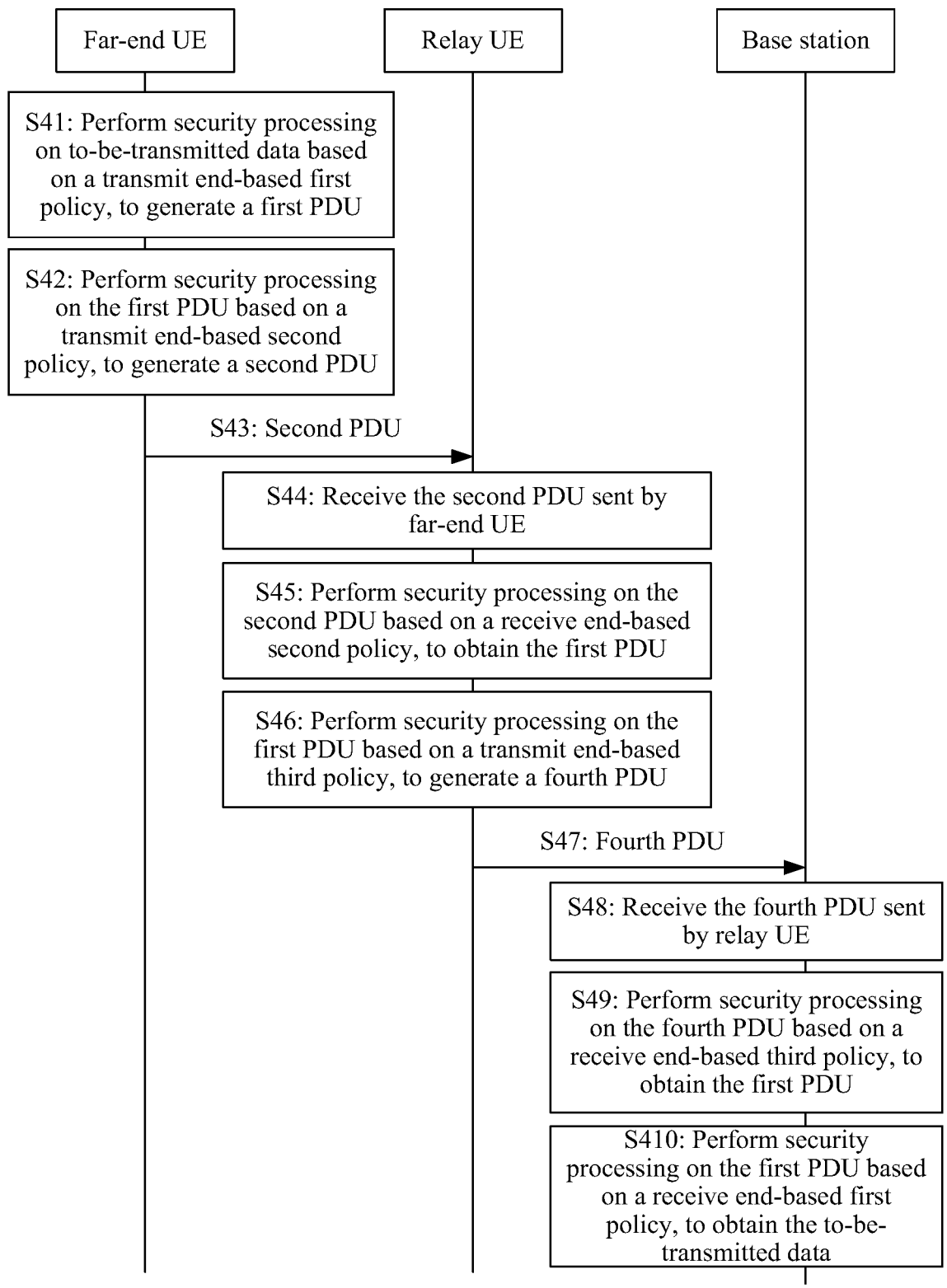
FIG. 14 is an interaction diagram of another data transmission method according to an embodiment of the present invention.

As shown in FIG. 14, FIG. 14 is a schematic interaction diagram of an uplink data transmission method according to an embodiment of the present invention. The method provided in this embodiment may be based on the system protocol stack shown in FIG. 9. To be specific, peer first PDCP layers are set in a far-end UE protocol stack and a relay UE protocol stack, and peer second PDCP layers are set in the relay UE protocol stack and a base station protocol stack. The method shown in FIG. 14 includes the following steps.

S41 to S45: Same as S21 to S25. After a step in a specific example of S25, the method may further include: A cellular network PDCP layer of the relay UE sends the first PDU to a second PDCP layer of the relay UE.

S46 to S410: Same as S34 to S38.

Referring to Embodiment 5, an embodiment of the present invention further provides a downlink data transmission method. The first device in this specification is a base station in Embodiment 5, and the second device in this specification is far-end UE in Embodiment 5.

Embodiment 5

Figure 15:
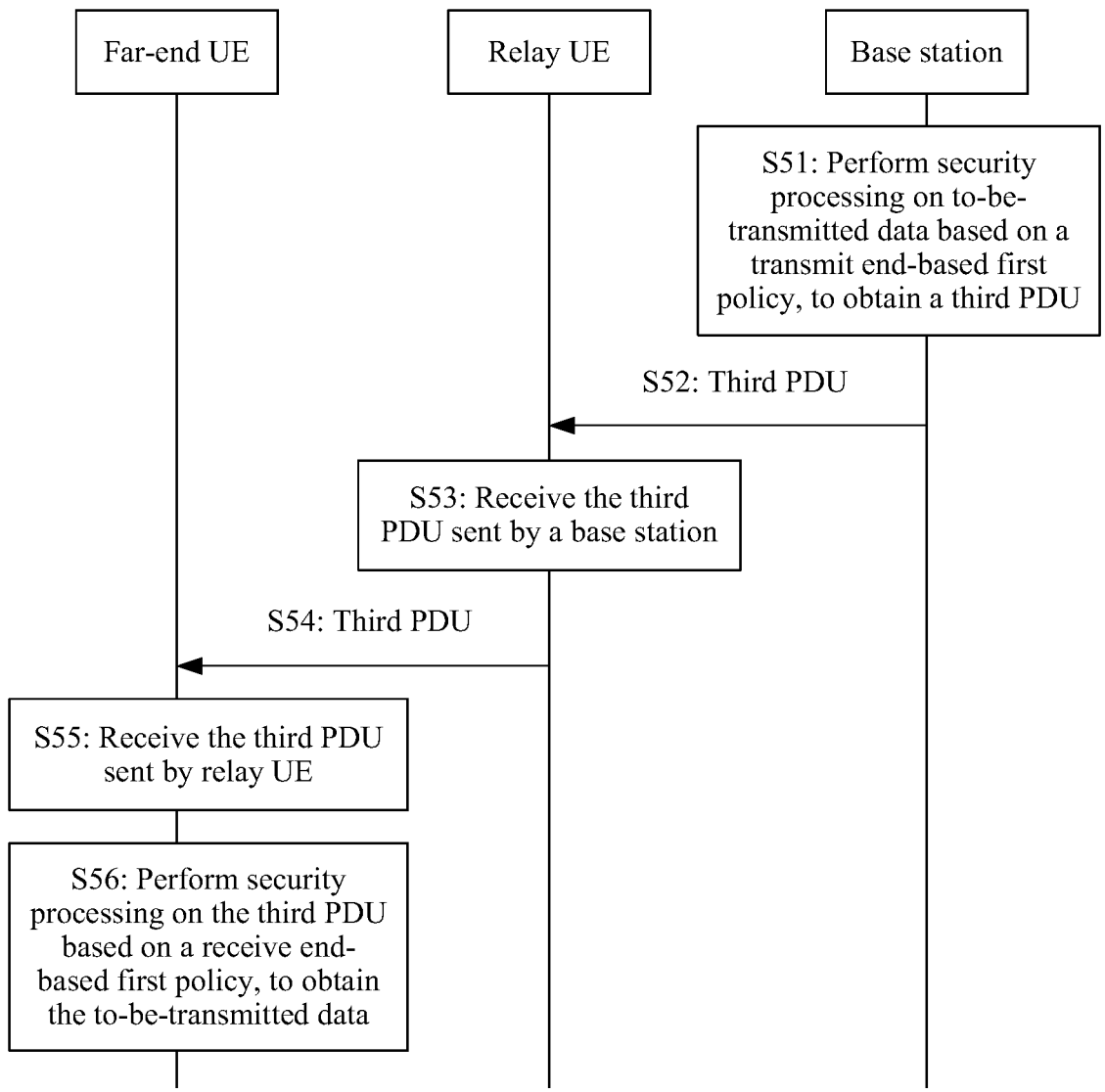
FIG. 15 is an interaction diagram of another data transmission method according to an embodiment of the present invention.

As shown in FIG. 15, FIG. 15 is a schematic interaction diagram of a downlink data transmission method according to an embodiment of the present invention. The method provided in this embodiment may be based on the user plane protocol stack shown in FIG. 4. The method shown in FIG. 15 includes the following steps.

S51: A base station performs security processing on to-be-transmitted data based on a transmit end-based first policy, to obtain a third PDU. The first policy is a security processing policy agreed on by far-end UE and the base station, the to-be-transmitted data is data sent by the far-end UE to a network side, and second transmission data is data sent by the network side to the far-end UE.

A cellular network PDCP layer of the base station receives to-be-transmitted data sent by an IP layer of an SGW, and performs security processing on the to-be-transmitted data, to obtain the third PDU. For a process in which the cellular network PDCP layer of the base station receives the to-be-transmitted data sent by the IP layer of the SGW, refer to the prior art.

After this step, the method may further include: The cellular network PDCP layer of the base station sends the third PDU to a second RLC layer of the base station, and then generates a radio wave signal after the third PDU successively passes through the second RLC layer, a second MAC layer, and a second PHY layer of the second base station.

S52: The base station sends the third PDU to relay UE.

An air interface of a second interface of the base station sends, to the relay UE, the radio wave signal generated based on the third PDU.

S53: The relay UE receives the third PDU sent by the base station.

An air interface of a second interface of the relay UE receives the radio wave signal sent by the base station, and generates the third PDU after sending the radio wave signal successively through a second PHY layer, a second MAC layer, and a second RLC layer of the relay UE. After this step, the second RLC layer of the relay UE sends the third PDU to a first RLC layer of the relay UE, and then the third PDU is finally sent to an air interface of a first interface of the relay UE successively through the first RLC layer, a first MAC layer, and a first PHY layer of the relay UE.

S54: The relay UE sends the third PDU to the far-end UE.

The relay UE sends, on the air interface of the first interface, the third PDU to the far-end UE.

S55: The relay UE receives the third PDU sent by the relay UE.

The far-end UE receives, on an air interface of a first interface, the third PDU sent by the relay UE. After this step, a first RLC layer of the far-end UE sends the third PDU to a cellular network PDCP layer of the far-end UE after the third PDU successively passes through a first PHY layer, a first MAC layer, and the first RLC layer of the far-end UE.

S56: The far-end UE performs security processing on the third PDU based on a receive end-based first policy, to obtain the to-be-transmitted data.

The cellular network PDCP layer of the far-end UE performs security processing on the third PDU based on the receive end-based first policy, to obtain the to-be-transmitted data.

It should be noted that the downlink data transmission method is a reverse process of the uplink data transmission method, and similar to the uplink data transmission method, a data packet between the far-end UE and the relay UE may be received and sent based on the second policy, and/or a data packet between the relay UE and the far-end UE may be received and sent based on the third policy. A specific implementation process is not described herein. Persons of ordinary skill in the art can derive the downlink data transmission method without creative efforts based on the uplink data transmission method provided above. Details are not described herein.

Embodiment 6

Figure 16:
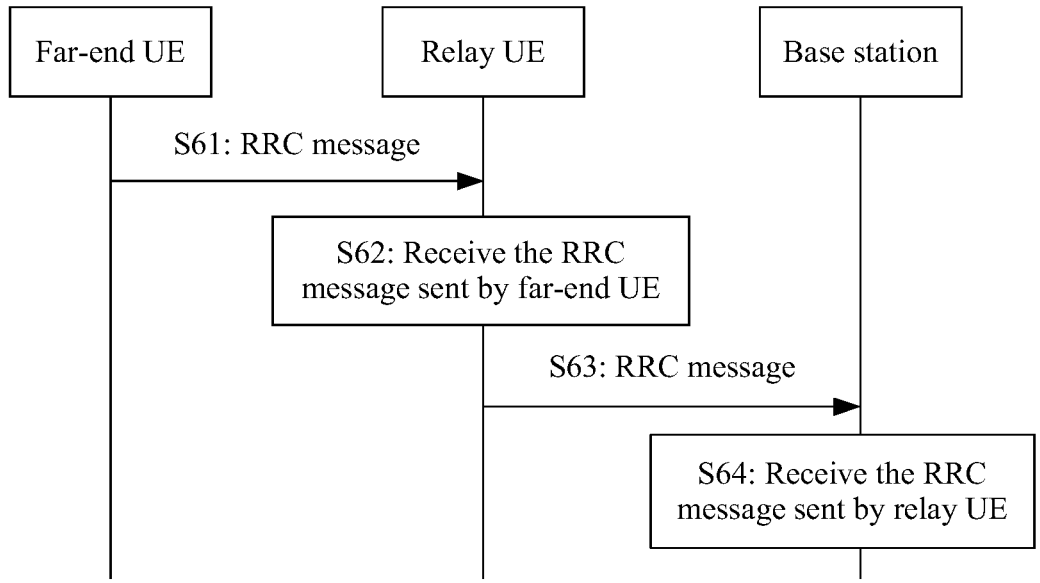
FIG. 16 is an interaction diagram of another data transmission method according to an embodiment of the present invention.

As shown in FIG. 16, FIG. 16 is a schematic interaction diagram of an uplink RRC message transmission method according to an embodiment of the present invention. The method provided in this embodiment may be based on the system protocol stack shown in FIG. 9. The method shown in FIG. 16 includes the following steps.

S61: Far-end UE sends an RRC message to relay UE.

An RRC layer of the far-end UE generates the RRC message, and transmits the RRC message to a cellular network PDCP layer of the far-end UE. After receiving the RRC message sent by the RRC layer of the far-end UE, the cellular network PDCP layer of the far-end UE may add an SN to the RRC message, and then, if integrity protection has been configured for a first policy, the cellular network PDCP layer of the far-end UE further performs integrity protection processing on the RRC message to which the SN is added, and sends, to a first RLC layer of the far-end UE, the RRC message on which integrity protection has been performed, or if integrity protection has not been configured for a first policy, the cellular network PDCP layer of the far-end UE directly sends, to a first RLC layer of the far-end UE, an RRC message to which an SN is added. Then, the RRC message to which the SN is added is finally sent to an air interface of a first interface of the far-end UE successively through the first RLC layer, a first MAC layer, and a first PHY layer of the far-end UE, and the far-end UE sends, on the air interface, the RRC message to which the SN is added. Alternatively, after receiving the RRC message sent by the RRC layer of the far-end UE, the cellular network PDCP layer of the far-end UE performs no processing, but directly forwards the RRC message to a first RLC layer of the far-end UE, and then the RRC message is finally sent to an air interface of a first interface of the far-end UE successively through the first RLC layer, a first MAC layer, and a first PHY layer of the far-end UE, and the far-end UE sends the RRC message on the air interface.

S62: The relay UE receives the RRC message sent by the far-end UE.

The relay UE receives, on an air interface of a first interface, the RRC message that is sent by the far-end UE and to which the SN is added. After this step, the RRC message to which the SN is added is forwarded from a first RLC layer of the relay UE to a second RLC layer of the relay UE successively through a first PHY layer, a first MAC layer, and the first RLC layer of the relay UE, and a radio wave signal is generated after the RRC message successively passes through a second MAC layer and a second PHY layer of the relay UE.

S63: The relay UE sends the RRC message to a base station.

The relay UE sends, on an air interface of a second interface, the radio wave signal to the base station.

S64: The base station receives the RRC message sent by the relay UE.

The base station receives the radio wave signal on an air interface of a second interface, and then the radio wave signal successively passes through a second PHY layer, a second MAC layer, and a second RLC layer of the base station, and the RRC message to which the SN is added is obtained. Then, the second RLC layer transmits, to a cellular network PDCP layer of the base station, the RRC message to which the SN is added, the cellular network PDCP layer removes the SN, to obtain the RRC message, and transmits the RRC message to an RRC layer that is of the base station and that is a peer to the far-end UE. The RRC layer that is of the base station and that is a peer to the far-end UE performs an action corresponding to the RRC message.

It should be noted that a process of an uplink RRC message transmission method based on the control plane protocol stack shown in FIG. 7 may be obtained with reference to Embodiment 2 to Embodiment 4 and Embodiment 6. Details are not described herein. A downlink RRC message transmission method is a reverse process of the uplink RRC message transmission method, and may be obtained with reference to Embodiment 5 and Embodiment 6. Details are not described herein.

Figure 17:
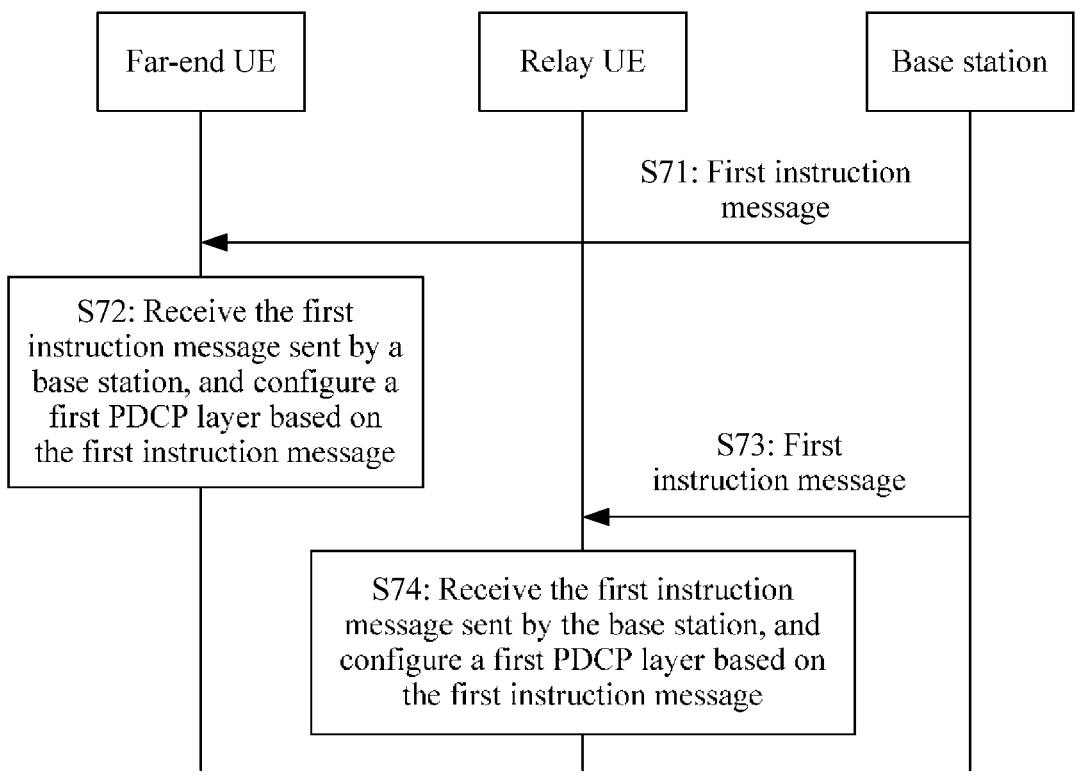
FIG. 17 is an interaction diagram of another data transmission method according to an embodiment of the present invention.

An embodiment of the present invention further provides a method for configuring a first PDCP layer. As shown in FIG. 17, the method includes the following steps.

S71: A base station sends a first instruction message to far-end UE, where the instruction message is used to instruct a receiver to configure a first PDCP layer.

S72: The far-end UE receives the first instruction message sent by the base station, and configures the first PDCP layer based on the first instruction message. A function that the first PDCP layer needs to implement in a control plane protocol stack and/or a user plane protocol stack is configured. For the function, refer to the foregoing description.

S73: The base station sends the first instruction message to relay UE, where the first instruction message is used to instruct a receiver to configure a first PDCP layer.

S74: The relay UE receives the first instruction message sent by the base station, and configures the first PDCP layer based on the first instruction message.

The relay UE configures a function that the first PDCP layer needs to implement in a control plane protocol stack and/or a user plane protocol stack. For the function, refer to the foregoing description.

The first PDCP layer in S71 and S72 is a peer to the first PDCP layer in S73 and S74.

It should be noted that because peer first PDCP layers are set on the far-end UE and the relay UE, S71 to S72 and S73 to S74 are usually performed in pairs. To be specific, a system performs S71 to S72 and S73 to S74, or performs neither S71 to S72 nor S73 to S74, and usually does not perform only one of S71 to S72 and S73 to S74. However, a sequence of S71 to S72 and S73 to S74 is not limited in this embodiment of the present invention. For example, S71 to S72 may be performed first, and then S73 to S74 are performed; or S73 to S74 may be performed first, and then S71 to S72 are performed; or S73 to S74 are performed in a process of performing S71 to S72.

Figure 18:
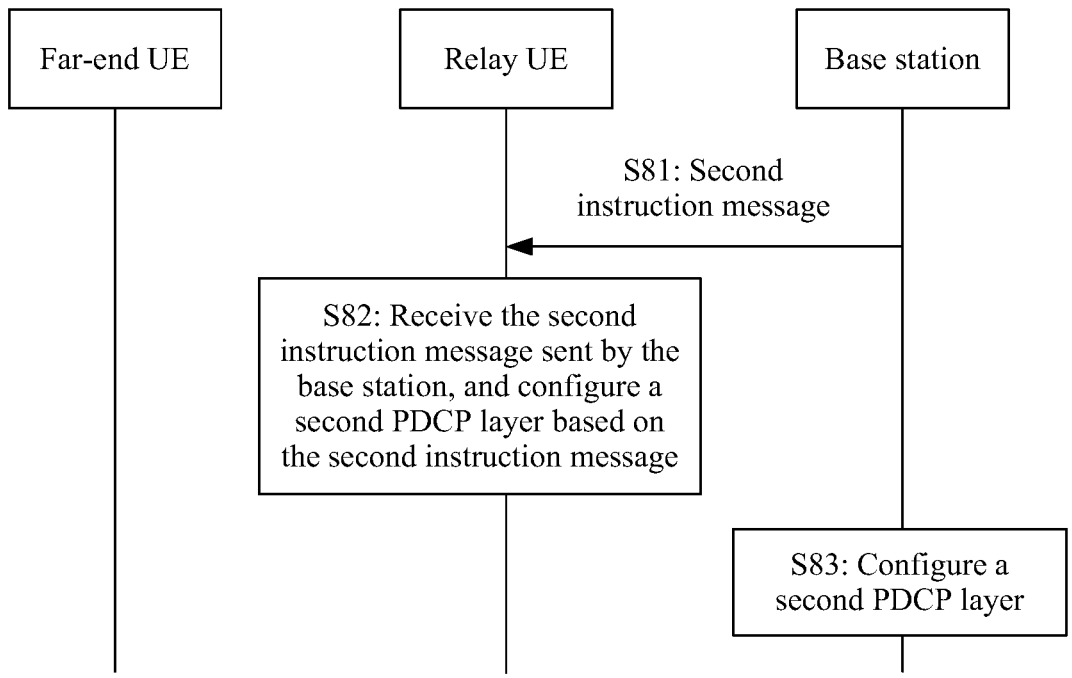
FIG. 18 is an interaction diagram of another data transmission method according to an embodiment of the present invention.

An embodiment of the present invention further provides a method for configuring a second PDCP layer. As shown in FIG. 18, the method includes the following steps.

S81: A base station sends a second instruction message to relay UE, where the second instruction message is used to instruct the relay UE to configure a second PDCP layer.

S82: The relay UE receives the second instruction message sent by the base station, and configures the second PDCP layer based on the second instruction message.

The relay UE configures a function that the second PDCP layer needs to implement in a control plane protocol stack and/or a user plane protocol stack. For the function, refer to the foregoing description.

S83: The base station configures the second PDCP layer.

The second PDCP layer in S81 and S82 is a peer to the second PDCP layer in S83.

It should be noted that because peer second PDCP layers are set on the relay UE and the base station, S81 to S82 and S83 are usually performed in pairs. To be specific, a system performs S81 to S82 and S83, or performs neither S81 to S82 nor S83, and usually does not perform only one of S81 to S82 and S83. However, a sequence of S81 to S82 and S83 is not limited in this embodiment of the present invention. For example, S81 to S82 may be performed first, and then S83 is performed; or S83 may be performed first, and then S81 to S82 are performed; or S83 is performed in a process of performing S81 to S82.

In addition, it should be noted that technical features in the foregoing method embodiments may be combined in the case of no conflict, to generate a new technical solution. Details are not described herein.

Figure 19:
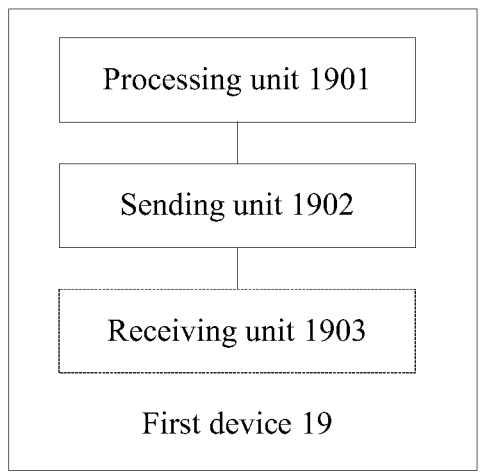
FIG. 19 is a schematic structural diagram of a first device according to an embodiment of the present invention.

As shown in FIG. 19, FIG. 19 is a schematic structural diagram of a first device 19 according to an embodiment of the present invention. The first device 19 is configured to perform an action of a first device 19 in any one of the methods provided above. The first device 19 includes:

a processing unit 1901, configured to perform, at a cellular network Packet Data Convergence Protocol (PDCP) layer of the first device 19, security processing on to-be-transmitted data based on a transmit end-based first policy, to generate a protocol data unit (PDU), where the first policy is a security processing policy agreed on by the first device 19 and the second device, and the to-be-transmitted data is data that the first device 19 needs to transmit to the second device; and a sending unit 1902, configured to send the PDU to the second device through relay user equipment (UE), where the second device includes a cellular network PDCP layer that is a peer to the cellular network PDCP layer of the first device 19.

The first device 19 is far-end UE, and the second device is a base station; or the first device 19 is a base station, and the second device is far-end UE.

Optionally, the sending unit 1902 is configured to send the PDU to the relay UE successively through the cellular network PDCP layer of the first device 19 and a protocol module of a first interface of the first device 19. The first interface is a communications interface between the first device 19 and the relay UE.

Optionally, a protocol module of an interface between the far-end UE and the relay UE includes a Media Access Control (MAC) layer and a physical (PHY) layer.

The sending unit 1902 is configured to send the PDU to the relay UE successively through the cellular network PDCP layer of the first device 19, a cellular network Radio Link Control (RLC) layer of the first device 19, and the protocol module of the first interface of the first device 19. The second device includes a cellular network RLC layer that is a peer to the cellular network RLC layer of the first device 19.

Optionally, a protocol module of an interface between the far-end UE and the relay UE includes a first PDCP layer, used to perform security processing on data based on a second policy agreed on by the far-end UE and the relay UE. The first device 19 is the far-end UE. As shown in FIG. 19, the first device 19 further includes:

a receiving unit 1903, configured to receive a first instruction message sent by the base station, where the first instruction message is used to instruct the far-end UE to establish the first PDCP layer.

The processing unit 1901 is further configured to establish the first PDCP layer based on the first instruction message.

Optionally, a protocol module of an interface between the far-end UE and the relay UE includes a first PDCP layer, used to perform security processing on data based on a second policy agreed on by the far-end UE and the relay UE. The first device 19 is the base station.

The sending unit 1902 is further configured to send a first instruction message to each of the far-end UE and the relay UE. The first instruction message is used to instruct a receiver to establish the first PDCP layer.

Optionally, a protocol module of an interface between the relay UE and the base station includes a second PDCP layer, used to perform security processing on data based on a third policy agreed on by the relay UE and the base station. The first device 19 is the base station.

The processing unit 1901 is further configured to establish the second PDCP layer.

The sending unit 1902 is further configured to send a second instruction message to the relay UE. The second instruction message is used to instruct the relay UE to establish the second PDCP layer.

Optionally, the processing unit 1901 is further configured to generate a radio resource control (RRC) message at an RRC layer of the first device 19.

The sending unit 1902 is further configured to send the RRC message to the second device through the relay UE. The RRC layer of the first device 19 is set at an upper layer of the cellular network PDCP layer of the first device 19, and the second device includes an RRC layer that is a peer to the RRC layer of the first device 19.

In hardware implementation, the sending unit 1902 may be a transmitter, the receiving unit 1903 may be a receiver, and the transmitter and the receiver may be integrated to form a transceiver. The processing unit 1901 may be embedded into or independent of a processor of the first device as hardware, or may be stored in a memory of the first device as software, so that the processor invokes and performs operations corresponding to the foregoing modules.

Figure 20:
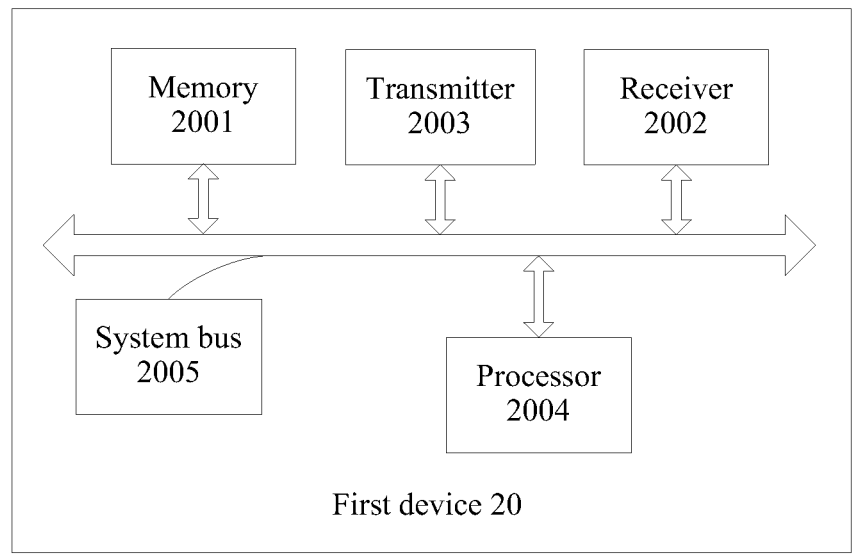
FIG. 20 is a schematic structural diagram of another first device according to an embodiment of the present invention.

As shown in FIG. 20, FIG. 20 is a schematic structural diagram of a first device 20 according to an embodiment of the present invention. The first device 20 is configured to perform an action of a first device 19 in any one of the methods provided above. The first device 20 includes a memory 2001, a receiver 2002, a transmitter 2003, a processor 2004, and a system bus 2005. The receiver 2002, the transmitter 2003, and the processor 2004 are connected by using the system bus 2005.

The memory 2001 is configured to store a computer execution instruction. When the first device 20 runs, the processor 2004 executes the computer execution instruction stored in the memory 2001, so that the first device 20 performs an action of a first device in any one of the method embodiments provided above. For the action performed by the first device, refer to the foregoing related description. Details are not described herein again.

For beneficial effects brought by the first device 19 and the first device 20, refer to the foregoing method embodiments. Details are not described herein again.

Figure 21:
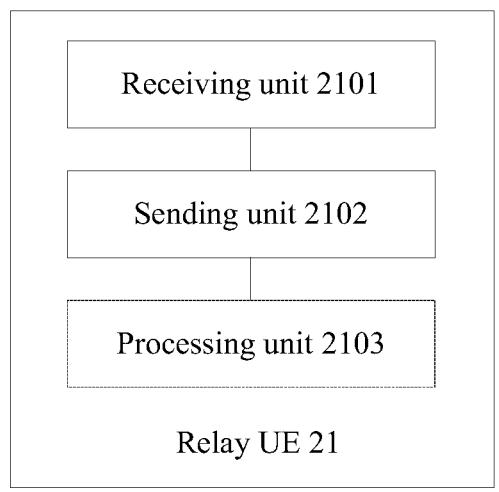
FIG. 21 is a schematic structural diagram of relay UE according to an embodiment of the present invention.

As shown in FIG. 21, FIG. 21 is a schematic structural diagram of relay UE 21 according to an embodiment of the present invention. The relay UE 21 is configured to perform an action of relay UE in any one of the methods provided above. The relay UE 21 includes:

a receiving unit 2101, configured to receive a protocol data unit PDU sent by a first device, where the PDU is a PDU generated after the first device performs, at a cellular network Packet Data Convergence Protocol (PDCP) layer of the first device, security processing on to-be-transmitted data based on a transmit end-based first policy, the first policy is a security processing policy agreed on by the first device and the second device, and the to-be-transmitted data is data that the first device needs to transmit to the second device; and a sending unit 2102, configured to send the PDU to the second device, where the second device includes a cellular network PDCP layer that is a peer to the cellular network PDCP layer of the first device.

The first device is far-end UE, and the second device is a base station; or the first device is a base station, and the second device is far-end UE.

Optionally, the sending unit 2102 is configured to send the PDU to the second device successively through a protocol module of a first interface of the relay UE 21 and a protocol module of a second interface of the relay UE 21. The first interface is a communications interface between the first device and the relay UE 21, and the second interface is a communications interface between the relay UE 21 and the second device.

Optionally, a protocol module of an interface between the far-end UE and the relay UE 21 includes a first PDCP layer, used to perform security processing on data based on a second policy agreed on by the far-end UE and the relay UE 21.

The receiving unit 2101 is further configured to receive a first instruction message sent by the base station. The first instruction message is used to instruct the far-end UE 21 to establish the first PDCP layer.

As shown in FIG. 21, the relay UE 21 may further include: a processing unit 2103, configured to establish the first PDCP layer based on the first instruction message.

Optionally, a protocol module of an interface between the relay UE 21 and the base station includes a second PDCP layer, used to perform security processing on data based on a third policy agreed on by the relay UE 21 and the base station.

The receiving unit 2101 is further configured to receive a second instruction message sent by the base station. The second instruction message is used to instruct the relay UE 21 to establish the second PDCP layer.

As shown in FIG. 21, the relay UE 21 may further include: a processing unit 2103, configured to establish the second PDCP layer based on the second instruction message.

Optionally, the receiving unit 2101 is further configured to receive a radio resource control (RRC) message sent by the first device. The RRC message is generated by the first device at an RRC layer of the first device.

The sending unit 2102 is further configured to send the RRC message to the second device. The second device includes an RRC layer that is a peer to the RRC layer of the first device.

In hardware implementation, the sending unit 2102 may be a transmitter, the receiving unit 2101 may be a receiver, and the transmitter and the receiver may be integrated to form a transceiver. The processing unit 2103 may be embedded into or independent of a processor of the relay UE as hardware, or may be stored in a memory of the relay UE as software, so that the processor invokes and performs operations corresponding to the foregoing modules.

Figure 22:
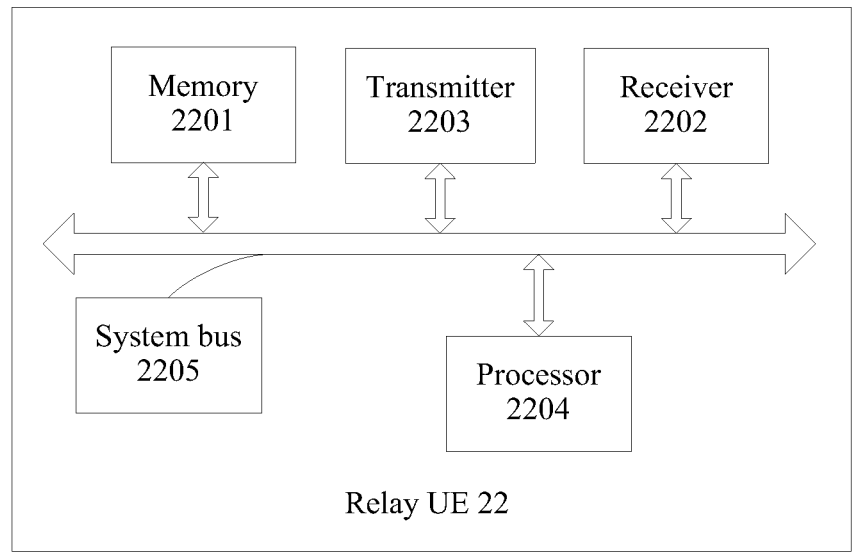
FIG. 22 is a schematic structural diagram of another relay UE according to an embodiment of the present invention.

FIG. 22 is a schematic structural diagram of relay UE 22 according to an embodiment of the present invention. The relay UE 22 is configured to perform an action of relay UE in any one of the methods provided above. The relay UE 22 includes a memory 2201, a receiver 2202, a transmitter 2203, a processor 2204, and a system bus 2205. The receiver 2202, the transmitter 2203, and the processor 2204 are connected by using the system bus 2205.

The memory 2201 is configured to store a computer execution instruction. When the relay UE 22 runs, the processor 2204 executes the computer execution instruction stored in the memory 2201, so that the relay UE 22 performs an action of relay UE in any one of the method embodiments provided above. For the action performed by the relay UE, refer to the foregoing related description. Details are not described herein again.

For beneficial effects brought by the relay UE 21 and the relay UE 22, refer to the foregoing method embodiments. Details are not described herein again.

Figure 23:
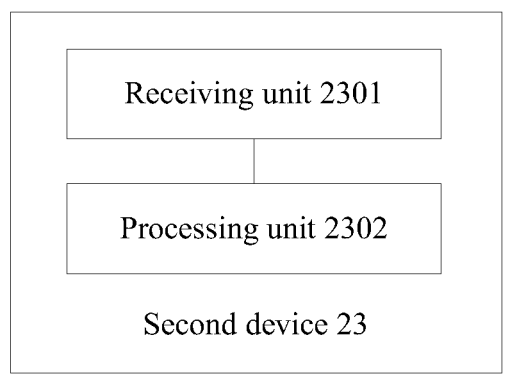
FIG. 23 is a schematic structural diagram of a second device according to an embodiment of the present invention.

As shown in FIG. 23, FIG. 23 is a schematic structural diagram of a second device 23 according to an embodiment of the present invention. The second device 23 is configured to perform an action of relay UE in any one of the methods provided above. The second device 23 includes:

a receiving unit 2301, configured to receive a protocol data unit (PDU) that is from a first device and that is forwarded by relay user equipment (UE)_, where the PDU is a PDU generated after the first device performs, at a cellular network Packet Data Convergence Protocol (PDCP) layer of the first device, security processing on to-be-transmitted data based on a transmit end-based first policy, the first policy is a security processing policy agreed on by the first device and the second device 23, and the to-be-transmitted data is data that the first device needs to transmit to the second device 23; and a processing unit 2302, configured to perform, at a cellular network PDCP layer of the second device 23, security processing on the PDU based on the receive end-based first policy, to obtain the to-be-transmitted data.

The cellular network PDCP layer of the first device is a peer to the cellular network PDCP layer of the second device 23; and the first device is far-end UE, and the second device 23 is a base station; or the first device is a base station, and the second device 23 is far-end UE.

Optionally, the processing unit 2302 is further configured to send the PDU to the cellular network PDCP layer of the second device 23 successively through a protocol module of a second interface of the second device 23. The second interface is a communications interface between the relay UE and the second device 23.

Optionally, a protocol module of an interface between the far-end UE and the relay UE includes a Media Access Control (MAC) layer and a physical (PHY) layer. The processing unit 2302 is configured to transmit the PDU to the cellular network PDCP layer of the second device 23 successively through a protocol module of a second interface of the second device 23 and a cellular network RLC layer of the second device 23. The first device includes a cellular network RLC layer that is a peer to the cellular network RLC layer of the second device 23.

Optionally, the receiving unit 2301 is further configured to: receive a radio resource control (RRC) message that is from the first device and that is forwarded by the relay UE, and transmit the RRC message to an RRC layer of the second device 23. The RRC layer of the second device 23 is set at an upper layer of the cellular network PDCP layer of the second device 23, and the first device includes an RRC layer that is a peer to the RRC layer of the second device 23.

In hardware implementation, the receiving unit 2301 may be a receiver, and the processing unit 2302 may be embedded into or independent of a processor of the second device as hardware, or may be stored in a memory of the second device as software, so that the processor invokes and performs operations corresponding to the foregoing modules.

Figure 24:
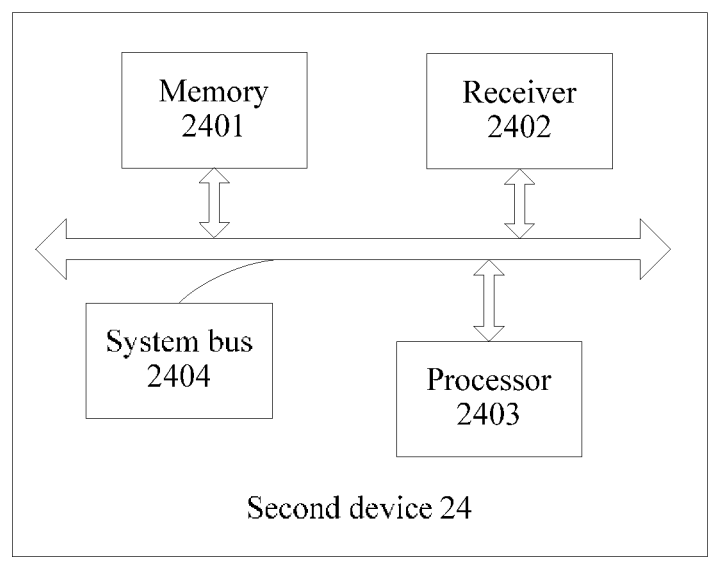
FIG. 24 is a schematic structural diagram of another second device according to an embodiment of the present invention.

As shown in FIG. 24, FIG. 24 is a schematic structural diagram of a second device 24 according to an embodiment of the present invention. The second device 24 is configured to perform an action of a second device 19 in any one of the methods provided above. The second device 24 includes a memory 2401, a receiver 2402, a processor 2403, and a system bus 2404. The receiver 2402 and the processor 2403 are connected by using the system bus 2404.

The memory 2401 is configured to store a computer execution instruction. When the second device 24 runs, the processor 2403 executes the computer execution instruction stored in the memory 2401, so that the second device 24 performs an action of a second device in any one of the method embodiments provided above. For the action performed by the second device, refer to the foregoing related description. Details are not described herein again.

For beneficial effects brought by the second device 23 and the second device 24, refer to the foregoing method embodiments. Details are not described herein again.

The processor in the first device, the relay UE, and the second device may be one processor, or may be a general term for a plurality of processing elements. The bus system may include a data bus, a power bus, a control bus, a signal status bus, and the like.

It may be clearly understood by persons skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A data transmission system, comprising:
    a first device, relay user equipment (UE), and a second device, wherein:
    the first device performs, at a cellular network Packet Data Convergence Protocol (PDCP) layer of the first device, security processing on to-be-transmitted data based on a transmit end-based first policy, to generate a protocol data unit (PDU), and sends the PDU to the relay UE, wherein the transmit end-based first policy is a security processing policy agreed on by the first device and the second device, and the to-be-transmitted data is data that the first device needs to transmit to the second device;
    the relay UE receives the PDU sent by the first device, and sends the PDU to a second device; and
    the second device receives the PDU sent by the relay UE, and performs, at a cellular network PDCP layer of the second device, security processing on the PDU based on a receive end-based first policy, to obtain the to-be-transmitted data; wherein
    the cellular network PDCP layer of the first device is a peer to the cellular network PDCP layer of the second device; and the first device is far-end UE, and the second device is a base station; or the first device is a base station, and the second device is far-end UE.

2. The system according to claim 1, wherein that the first device sends the PDU to the relay UE comprises:
    the first device sends the PDU to the relay UE successively through the cellular network PDCP layer of the first device and a protocol module of a first interface of the first device;
    that the relay UE sends the PDU to the second device comprises:
    the relay UE sends the PDU to the second device successively through a protocol module of a first interface of the relay UE and a protocol module of a second interface of the relay UE; and
    that the second device receives the PDU sent by the relay UE, and performs, at a cellular network PDCP layer of the second device, security processing on the PDU based on the receive end-based first policy, to obtain the to-be-transmitted data comprises:
    the second device receives the PDU sent by the relay UE, transmits the PDU to the cellular network PDCP layer of the second device through a protocol module of a second interface of the second device, and performs, at the cellular network PDCP layer of the second device, security processing on the PDU based on the receive end-based first policy, to obtain the to-be-transmitted data; wherein
    the protocol module of the first interface of the relay UE is a peer to the protocol module of the first interface of the first device, the protocol module of the second interface of the relay UE is a peer to the protocol module of the second interface of the second device, the first interface is a communications interface between the first device and the relay UE, and the second interface is a communications interface between the relay UE and the second device.

3. The system according to claim 1, wherein a protocol module of an interface between the far-end UE and the relay UE comprises a Media Access Control (MAC) layer and a physical (PHY) layer, and that the first device sends the PDU to the relay UE successively through the cellular network PDCP layer of the first device and a protocol module of a first interface of the first device comprises:
    the first device sends the PDU to the relay UE successively through the cellular network PDCP layer of the first device, a cellular network Radio Link Control (RLC) layer of the first device, and the protocol module of the first interface of the first device; and
    that the second device receives the PDU sent by the relay UE, and transmits the PDU to the cellular network PDCP layer of the second device successively through a protocol module of a second interface of the second device comprises:
    the second device receives the PDU sent by the relay UE, and transmits the PDU to the cellular network PDCP layer of the second device successively through the protocol module of the second interface of the second device and a cellular network RLC layer of the second device.

4. The system according to claim 1, wherein a protocol module of an interface between the far-end UE and the relay UE comprises a first PDCP layer, used to perform security processing on data based on a second policy agreed on by the far-end UE and the relay UE;
    the base station sends a first instruction message to each of the far-end UE and the relay UE, wherein the first instruction message is used to instruct a receiver to establish the first PDCP layer;
    the far-end UE receives the first instruction message sent by the base station, and establishes the first PDCP layer on the far-end UE based on the first instruction message; and
    the relay UE receives the first instruction message sent by the base station, and establishes the first PDCP layer on the relay UE based on the first instruction message.

5. The system according to claim 2, wherein a protocol module of an interface between the far-end UE and the base station comprises a second PDCP layer, used to perform security processing on data based on a third policy agreed on by the relay UE and the base station;

the base station establishes the second PDCP layer, and sends a second instruction message to the relay UE, wherein the second instruction message is used to instruct the relay UE to establish the second PDCP layer; and the relay UE receives the second instruction message sent by the base station, and establishes the second PDCP layer on the relay UE based on the second instruction message.

6. A data transmission method, comprising:

performing, by a first device at a cellular network Packet Data Convergence Protocol (PDCP) layer of the first device, security processing on to-be-transmitted data based on a transmit end-based first policy, to generate a protocol data unit (PDU), wherein the transmit end-based first policy is a security processing policy agreed on by the first device and the second device, and the to-be-transmitted data is data that the first device needs to transmit to the second device; and sending, by the first device, the PDU to the second device through relay user equipment (UE), wherein the second device comprises a cellular network PDCP layer that is a peer to the cellular network PDCP layer of the first device; wherein the first device is far-end UE, and the second device is a base station; or the first device is a base station, and the second device is far-end UE.

7. The method according to claim 6, wherein the sending, by the first device, the PDU to the relay UE comprises:

sending, by the first device, the PDU to the relay UE successively through the cellular network PDCP layer of the first device and a protocol module of a first interface of the first device, wherein the first interface is a communications interface between the first device and the relay UE.

8. The method according to claim 7, wherein a protocol module of an interface between the far-end UE and the relay UE comprises a Media Access Control (MAC) layer and a physical (PHY) layer, and the sending, by the first device, the PDU to the relay UE successively through the cellular network PDCP layer of the first device and a protocol module of a first interface of the first device comprises:

sending, by the first device, the PDU to the relay UE successively through the cellular network PDCP layer of the first device, a cellular network Radio Link Control (RLC) layer of the first device, and the protocol module of the first interface of the first device, wherein the second device comprises a cellular network RLC layer that is a peer to the cellular network RLC layer of the first device.

9. The method according to claim 7, wherein a protocol module of an interface between the far-end UE and the relay UE comprises a first PDCP layer, used to perform security processing on data based on a second policy agreed on by the far-end UE and the relay UE, the first device is the far-end UE, and the method further comprises:

receiving, by the far-end UE, a first instruction message sent by the base station, wherein the first instruction message is used to instruct the far-end UE to establish the first PDCP layer; and establishing, by the far-end UE, the first PDCP layer based on the first instruction message.

10. The method according to claim 7, wherein a protocol module of an interface between the far-end UE and the relay UE comprises a first PDCP layer, used to perform security processing on data based on a second policy agreed on by the far-end UE and the relay UE, the first device is the base station, and the method further comprises:

sending, by the base station, a first instruction message to each of the far-end UE and the relay UE, wherein the first instruction message is used to instruct a receiver to establish the first PDCP layer.

11. A first device, comprising:

a processor, configured to perform, at a cellular network Packet Data Convergence Protocol (PDCP) layer of the first device, security processing on to-be-transmitted data based on a transmit end-based first policy, to generate a protocol data unit (PDU), wherein the transmit end-based first policy is a security processing policy agreed on by the first device and the second device, and the to-be-transmitted data is data that the first device needs to transmit to the second device; and a transmitter, configured to send the PDU to the second device through relay user equipment UE, wherein the second device comprises a cellular network PDCP layer that is a peer to the cellular network PDCP layer of the first device; wherein the first device is far-end UE, and the second device is a base station; or the first device is a base station, and the second device is far-end UE.

12. The first device according to claim 11, wherein:

the transmitter is configured to send the PDU to the relay UE successively through the cellular network PDCP layer of the first device and a protocol module of a first interface of the first device, wherein the first interface is a communications interface between the first device and the relay UE.

13. The first device according to claim 12, wherein a protocol module of an interface between the far-end UE and the relay UE comprises a Media Access Control (MAC) layer and a physical (PHY) layer; and the transmitter is configured to send the PDU to the relay UE successively through the cellular network PDCP layer of the first device, a cellular network Radio Link Control (RLC) layer of the first device, and the protocol module of the first interface of the first device, wherein the second device comprises a cellular network RLC layer that is a peer to the cellular network RLC layer of the first device.

14. The first device according to claim 12, wherein a protocol module of an interface between the far-end UE and the relay UE comprises a first PDCP layer, used to perform security processing on data based on a second policy agreed on by the far-end UE and the relay UE, a first device is the far-end UE, and the first device further comprises:

a receiver, configured to receive a first instruction message sent by the base station, wherein the first instruction message is used to instruct the far-end UE to establish the first PDCP layer; and the processor is further configured to establish the first PDCP layer based on the first instruction message.

15. The first device according to claim 12, wherein a protocol module of an interface between the far-end UE and the relay UE comprises a first PDCP layer, used to perform security processing on data based on a second policy agreed on by the far-end UE and the relay UE, the first device is the base station; and the transmitter is further configured to send a first instruction message to each of the far-end UE and the relay UE, wherein the first instruction message is used to instruct a receiver to establish the first PDCP layer.

16. Relay user equipment UE, comprising:
a receiver, configured to receive a protocol data unit (PDU) sent by a first device, wherein the PDU is a PDU generated after the first device performs, at a cellular network Packet Data Convergence Protocol (PDCP) layer of the first device, security processing on to-be-transmitted data based on a transmit end-based first policy, the transmit end-based first policy is a security processing policy agreed on by the first device and the second device, and the to-be-transmitted data is data that the first device needs to transmit to the second device; and
a transmitter, configured to send the PDU to the second device, wherein the second device comprises a cellular network PDCP layer that is a peer to the cellular network PDCP layer of the first device; wherein
the first device is far-end UE, and the second device is a base station; or the first device is a base station, and the second device is far-end UE.

17. The relay UE according to claim 16, wherein:
the transmitter is configured to send the PDU to the second device successively through a protocol module of a first interface of the relay UE and a protocol module of a second interface of the relay UE, wherein the first interface is a communications interface between the first device and the relay UE, and the second interface is a communications interface between the relay UE and the second device.

18. The relay UE according to claim 16, wherein a protocol module of an interface between the far-end UE and the relay UE comprises a first PDCP layer, used to perform security processing on data based on a second policy agreed on by the far-end UE and the relay UE;
the receiver is further configured to receive a first instruction message sent by the base station, wherein the first instruction message is used to instruct the relay UE to establish the first PDCP layer; and
the relay UE further comprises:
a processor, configured to establish the first PDCP layer based on the first instruction message.

19. The relay UE according to claim 16, wherein a protocol module of an interface between the relay UE and the base station comprises a second PDCP layer, used to perform security processing on data based on a third policy agreed on by the relay UE and the base station;
the receiver is further configured to receive a second instruction message sent by the base station, wherein the second instruction message is used to instruct the relay UE to establish the second PDCP layer; and
the relay UE further comprises:
a processor, configured to establish the second PDCP layer based on the second instruction message.

20. The relay UE according to claim 16, wherein:
the receiver is further configured to receive a radio resource control (RRC) message sent by the first device, wherein the RRC message is generated by the first device at an RRC layer of the first device; and
the transmitter is further configured to send the RRC message to the second device, wherein the second device comprises an RRC layer that is a peer to the RRC layer of the first device.

* * * * *